(12) United States Patent
Norieda et al.

(10) Patent No.: US 12,411,544 B2
(45) Date of Patent: Sep. 9, 2025

(54) VIRTUAL SPACE PROVIDING DEVICE, VIRTUAL SPACE PROVIDING METHOD, AND COMPUTER-READABLE STORAGE MEDIUM

(71) Applicant: NEC Corporation, Tokyo (JP)

(72) Inventors: Shin Norieda, Tokyo (JP); Kenta Fukuoka, Tokyo (JP); Yoshiyuki Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/685,261

(22) PCT Filed: Sep. 3, 2021

(86) PCT No.: PCT/JP2021/032506
§ 371 (c)(1),
(2) Date: Feb. 21, 2024

(87) PCT Pub. No.: WO2023/032172
PCT Pub. Date: Mar. 9, 2023

(65) Prior Publication Data
US 2024/0361828 A1    Oct. 31, 2024

(51) Int. Cl.
*G06F 3/01* (2006.01)
*G06T 5/70* (2024.01)
(Continued)

(52) U.S. Cl.
CPC .............. *G06F 3/012* (2013.01); *G06T 5/70* (2024.01); *G06T 19/00* (2013.01); *G06V 40/168* (2022.01);
(Continued)

(58) Field of Classification Search
CPC .......... G06F 3/012; G06F 3/011; G06F 3/013; G06F 2203/011; G06T 5/70; G06T 19/00;
(Continued)

(56) References Cited

U.S. PATENT DOCUMENTS

| 2018/0205943 A1* | 7/2018 | Trail .......................... G06T 7/73 |
| 2018/0286122 A1* | 10/2018 | Nakashima ........... A63F 13/795 |
| 2018/0373328 A1* | 12/2018 | Sawaki ................ G02B 27/017 |
| 2019/0188895 A1 | 6/2019 | Miller et al. |
| 2021/0001862 A1* | 1/2021 | Senechal .............. G06V 20/593 |

FOREIGN PATENT DOCUMENTS

| JP | H11-265239 A | 9/1999 |
| JP | 2005-352154 A | 12/2005 |

(Continued)

OTHER PUBLICATIONS

International Search Report for PCT Application No. PCT/JP2021/032506, mailed on Oct. 19, 2021.
(Continued)

*Primary Examiner* — Brent D Castiaux
(74) *Attorney, Agent, or Firm* — Sughrue Mion, PLLC

(57) ABSTRACT

One of the purposes of the present disclosure is to provide a virtual space providing device and the like that are capable of inferring a feeling of a user, who uses a virtual space, toward a specific target while suppressing calculation load. An information processing device according to one aspect of the present disclosure comprises: an output control means for performing control to output an output image, which is an image according to an avatar in a virtual space, to a user who operates the avatar; a line-of-sight inference means for inferring the line of sight of the user on the basis of a predetermined range in the output image; and a feeling inference means for inferring a feeling of the user on the basis of a captured image in which the user imaged by an imaging device is included.

20 Claims, 19 Drawing Sheets

(51) Int. Cl.
  *G06T 19/00* (2011.01)
  *G06V 40/16* (2022.01)
(52) U.S. Cl.
  CPC ...... *G06V 40/174* (2022.01); *G06F 2203/011* (2013.01); *G06T 2219/024* (2013.01)
(58) Field of Classification Search
  CPC ............ G06T 2219/024; G06V 40/168; G06V 40/174
  See application file for complete search history.

(56) References Cited

FOREIGN PATENT DOCUMENTS

| JP | 2019-032844 A | 2/2019 |
|---|---|---|
| JP | 2019-128683 A | 8/2019 |
| JP | 2019-193697 A | 11/2019 |
| JP | 2020-004060 A | 1/2020 |
| JP | 2020-038336 A | 3/2020 |
| JP | 2021-021889 A | 2/2021 |
| JP | 2021-507355 A | 2/2021 |
| JP | 6872066 B1 | 5/2021 |

OTHER PUBLICATIONS

English translation of Written opinion for PCT Application No. PCT/JP2021/032506, mailed on Oct. 19, 2021.
Kaoru Tanaka, "The Tracking System of the Visual Information by HMD Restricted with the Mask", TVRSJ vol. 7 No. 2 pp. 257-266, 2002 [online], https://www.jstage.jst.go.jp/article/tvrsj/7/2/7_KJ00007553778/_article/-char/ja/ [Search Date: Oct. 8, 2021], pp. 257-266.
JP Office Action for JP Application No. 2023-544952, mailed on Apr. 15, 2025 with English Translation.

* cited by examiner

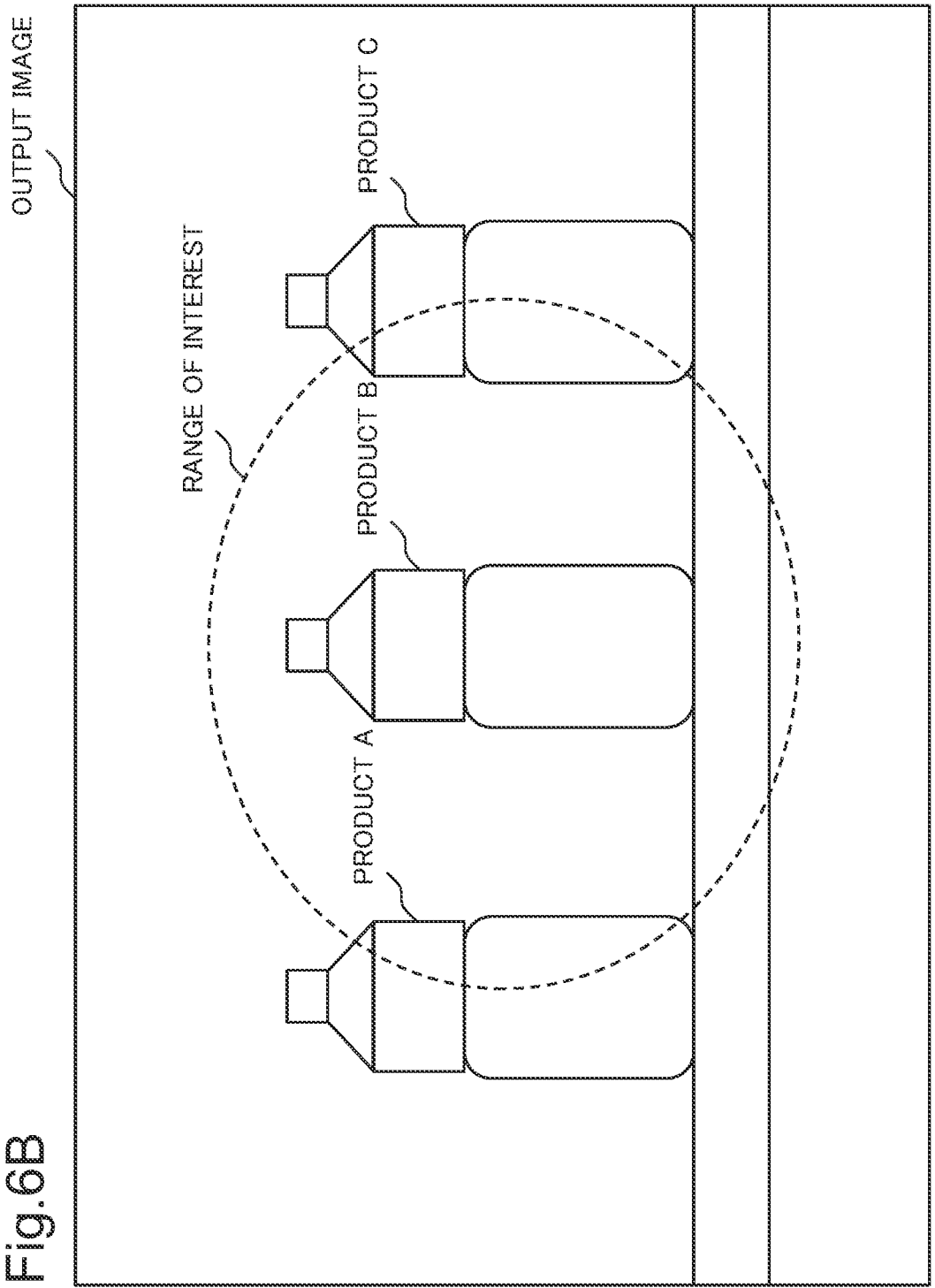

VIRTUAL SPACE PROVIDING DEVICE, VIRTUAL SPACE PROVIDING METHOD, AND COMPUTER-READABLE STORAGE MEDIUM

This application is a National Stage Entry of PCT/JP2021/032506 filed on Sep. 3, 2021, the contents of all of which are incorporated herein by reference, in their entirety.

TECHNICAL FIELD

The present disclosure relates to a technology for controlling a virtual space.

BACKGROUND ART

There is a technology for a plurality of users to communicate with each other in a virtual space. For example, PTL 1 discloses a technology for constructing a virtual office (VR office) by combining a three-dimensional image showing a virtual user with a virtual reality (VR) image of the office. At this time, in the technology disclosed in PTL 1, an operation of moving a three-dimensional image showing the user in the VR office or communicating with another user via the three-dimensional image showing the user in the VR office is performed.

In such an interaction via the image in the virtual space, it may be more difficult for the user to grasp a state of another user than in a face-to-face interaction.

In this regard, PTL 1 discloses a technology for adding an expression according to an emotion of the user to the three-dimensional image showing the user.

Furthermore, PTL 2 discloses that an avatar image showing a user is arranged in a virtual space. In addition, PTL 2 discloses that an emotion of the user is determined from a state of a region of the user's own face, and an avatar image is generated according to the emotion.

Furthermore, PTL 3 relates to a technology for recognizing a human emotion. PTL 3 discloses a technique for displaying an avatar instead of an image of a participant captured by a camera when an online meeting is performed via a computer. At this time, in the technology of PTL 3, an emotion of the participant is recognized based on the image obtained by capturing the participant, and an avatar image is displayed according to the recognized emotion.

CITATION LIST

Patent Literature

PTL 1: JP 2019-128683 A
PTL 2: JP 2020-38336 A
PTL 3: JP 6872066 B1

SUMMARY OF INVENTION

Technical Problem

PTL 2 also discloses that it is determined which object the user is looking at, and it is determined what kind of emotion the user has toward the looked-at object. At this time, the object looked at by the user is determined by detecting a line of sight of the user. However, in the technology disclosed in PTL 2, in order to detect the line of sight of the user, it is necessary to provide a point light source and perform image processing on a captured image obtained by capturing an image at the time when light from the point light source is reflected to the cornea of the user. Therefore, a calculation load related to the image processing is caused. In this respect, there is room for improvement.

PTL 1 and PTL 3 do not disclose acquiring a user's emotion toward a specific object.

The present disclosure has been made in view of the aforementioned problem, and an object of the present disclosure is to provide a virtual space providing device and the like capable of estimating an emotion of a user who uses a virtual space toward a specific object while suppressing a calculation load.

Solution to Problem

An information processing device according to an aspect of the present disclosure includes an output control means that performs control to output an output image, which is an image according to an avatar in a virtual space, to a user who operates the avatar, a line-of-sight estimation means that estimates a line of sight of the user based on a predetermined range on the output image, and an emotion estimation means that estimates an emotion of the user based on a captured image captured to show the user by an image capturing device.

An information processing method according to an aspect of the present disclosure includes performing control to output an output image, which is an image according to an avatar in a virtual space, to a user who operates the avatar, estimating a line of sight of the user based on a predetermined range on the output image, and estimating an emotion of the user based on a captured image captured to show the user by an image capturing device.

A computer-readable storage medium according to an aspect of the present disclosure stores a program for causing a computer to execute performing control to output an output image, which is an image according to an avatar in a virtual space, to a user who operates the avatar, estimating a line of sight of the user based on a predetermined range on the output image, and estimating an emotion of the user based on a captured image captured to show the user by an image capturing device.

Advantageous Effects of Invention

According to the present disclosure, it is possible to estimate an emotion of a user who uses a virtual space toward a specific object while suppressing a calculation load.

BRIEF DESCRIPTION OF DRAWINGS

FIG. 6B is a diagram illustrating another example of an output image according to the second example embodiment of the present disclosure.

EXAMPLE EMBODIMENT

Hereinafter, example embodiments of the present disclosure will be described with reference to the drawings.

First Example Embodiment

An outline of a virtual space providing device according to the present disclosure will be described.

Figure 1:
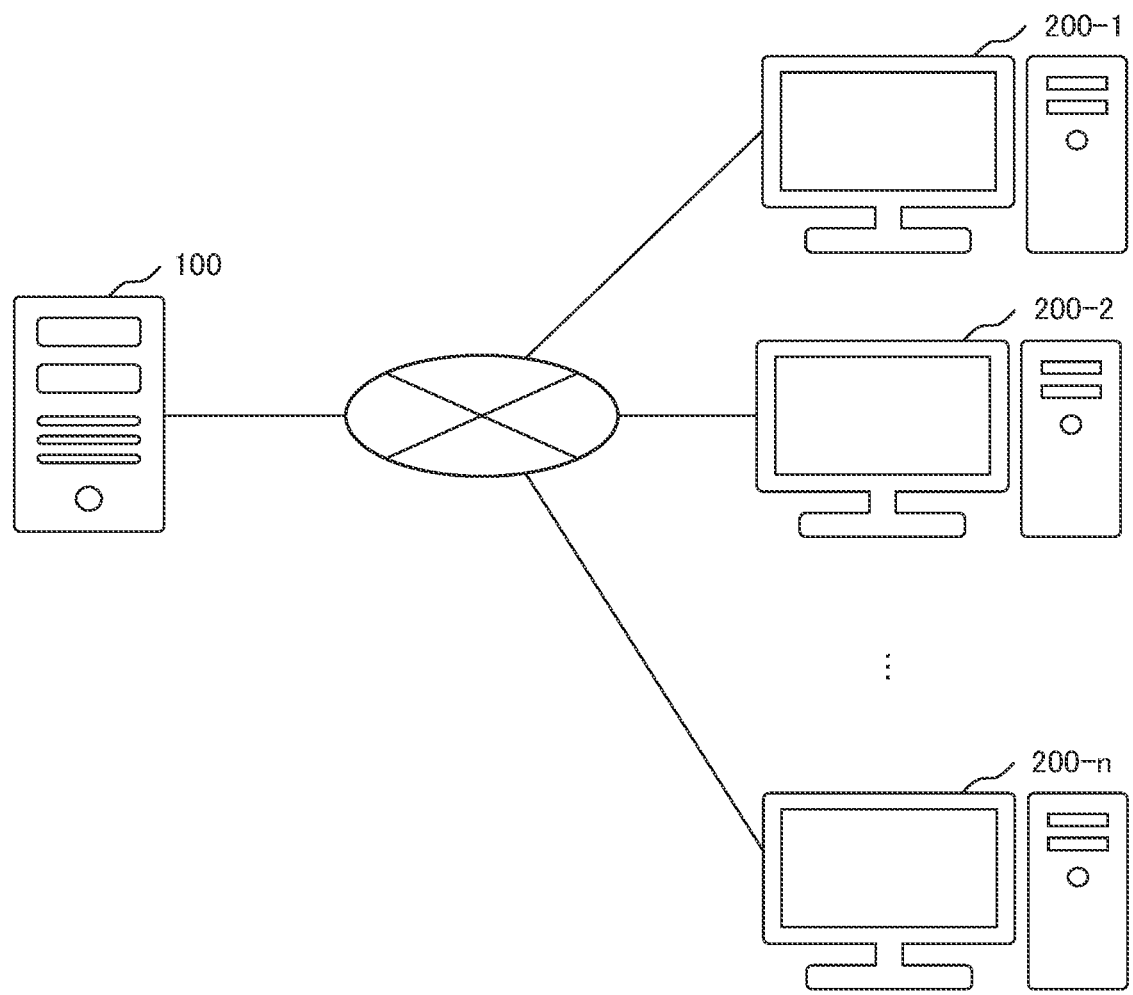
FIG. 1 is a diagram schematically illustrating an example of a configuration including a virtual space providing device according to a first example embodiment of the present disclosure.

FIG. 1 is a diagram schematically illustrating an example of a configuration including a virtual space providing device 100. As illustrated in FIG. 1, the virtual space providing device 100 is communicably connected to user terminals 200-1, 200-2, . . . , and 200-$n$ (n is a natural number of 1 or more) via a wireless or wired network. Here, when the user terminals 200-1, 200-2, . . . , and 200-$n$ are not distinguished from one another, they are simply referred to as the user terminal 200. The user terminal 200 is a device operated by a user. The user terminal 200 is, for example, a personal computer, but is not limited to this example. The user terminal 200 may be a smartphone or a tablet terminal, or may be a device including a goggle-type wearable terminal (also referred to as a head-mounted display) having a display. In addition, the user terminal 200 includes an input device such as a keyboard, a mouse, a microphone, or a wearable device that performs an operation based on a motion of the user, and an output device such as a display or a speaker. Further, the user terminal 200 includes an image capturing device.

Figure 2:
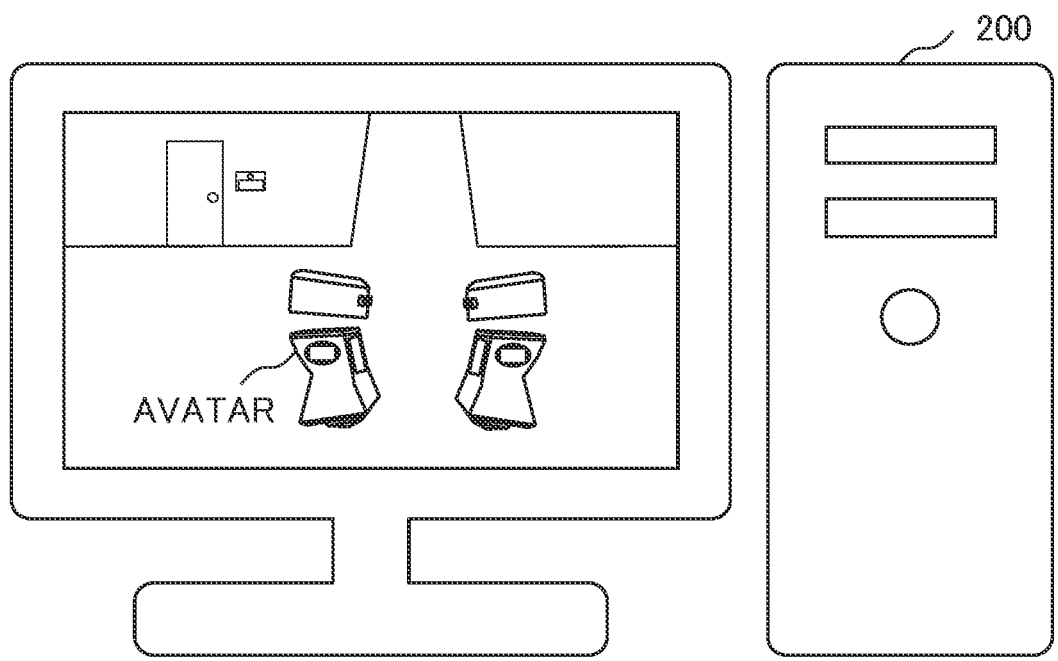
FIG. 2 is a diagram schematically illustrating an example of a virtual space displayed on a user terminal according to the first example embodiment of the present disclosure.

First, a virtual space in the present disclosure will be described. The virtual space is a virtual space shared by a plurality of users, and is a space in which operations of the users are reflected. The virtual space is also referred to as a VR space. For example, the virtual space is provided by the virtual space providing device 100. The user terminal 200 displays an image showing the virtual space. FIG. 2 is a diagram schematically illustrating an example of a virtual space displayed on the user terminal 200. In the example of FIG. 2, the virtual space is displayed on the display of the user terminal 200. As illustrated in FIG. 2, an avatar is included in the virtual space. The avatar is an object operated by the user. The user utilizes the virtual space by operating the avatar. For example, as will be described later, an image of the virtual space from the viewpoint of the avatar operated by the user is displayed on the user terminal 200. In this case, the image displayed on the user terminal 200 may be updated according to a motion of the avatar. Furthermore, for example, the user may be able to communicate with another user by performing an action with respect to an avatar operated by the another user. Note that the device that provides a virtual space may not be the virtual space providing device 100. For example, an external device that is not illustrated may provide a virtual space.

Figure 3:
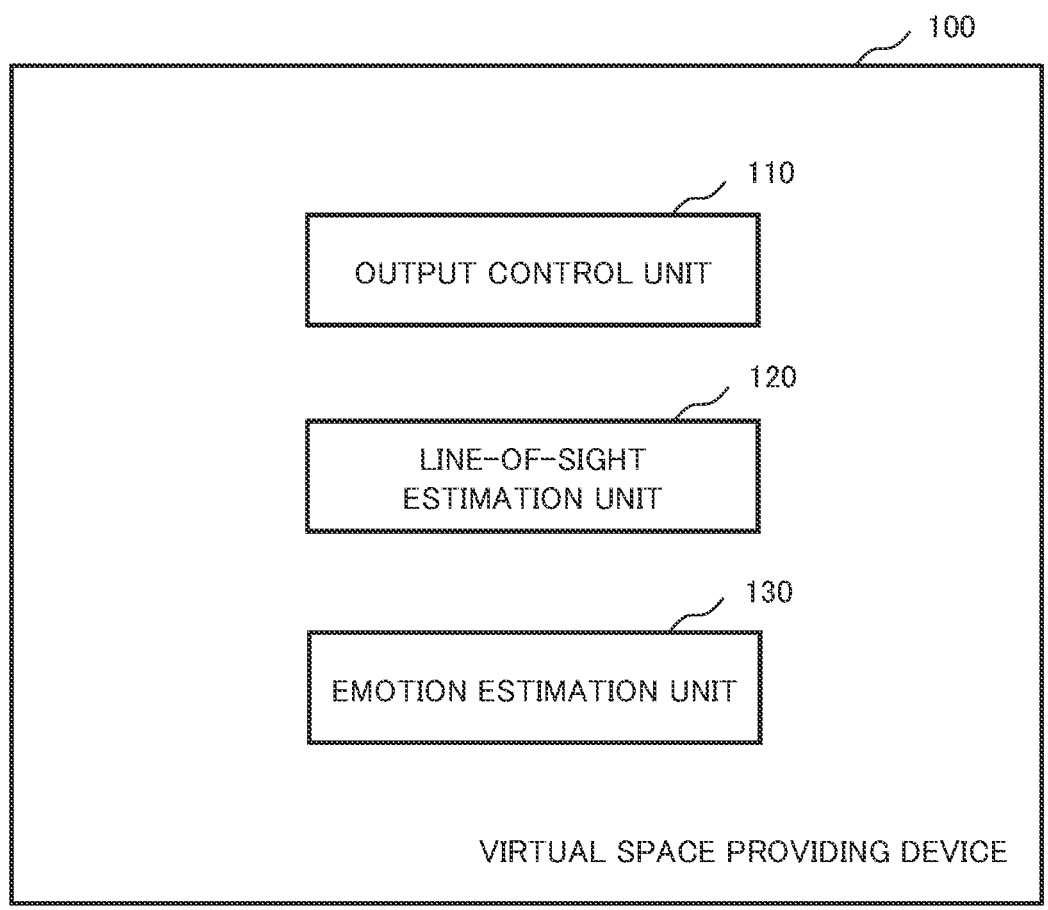
FIG. 3 is a block diagram illustrating an example of a functional configuration of the virtual space providing device according to the first example embodiment of the present disclosure.

FIG. 3 is a block diagram illustrating an example of a functional configuration of the virtual space providing device 100 according to the first example embodiment. As illustrated in FIG. 3, the virtual space providing device 100 includes an output control unit 110, a line-of-sight estimation unit 120, and an emotion estimation unit 130.

The output control unit 110 performs control to output various kinds of data to the user. For example, the output control unit 110 performs control to output an image showing a virtual space to the user terminal 200 used by the user. Here, the image showing the virtual space and output to the user is also referred to as an output image. The output image is, for example, an image in which the virtual space is shown from the viewpoint of the avatar. Therefore, for example, the output control unit 110 may update the output image according to the orientation of the avatar. At this time, the orientation of the avatar is changed by, for example, an operation of the user. In this manner, the output control unit 110 performs control to output the output image, which is an image according to the avatar in the virtual space, to the user who operates the avatar. The output control unit 110 is an example of an output control means.

The line-of-sight estimation unit 120 estimates a line of sight of the user. For example, the line-of-sight estimation unit 120 may estimate that the line of sight of the user is directed to a predetermined range of the output image. Note that the estimation of the line of sight is not limited to this example. In this manner, the line-of-sight estimation unit 120 estimates a line of sight of the user based on the predetermined range on the output image. The line-of-sight estimation unit 120 is an example of an estimation means.

The emotion estimation unit 130 estimates an emotion of the user. For example, the emotion estimation unit 130 acquires a captured image captured by an image capturing device, and estimates an emotion of the user shown in the captured image. In this case, for example, it is assumed that the user is captured by the image capturing device included in the user terminal 200. For example, the emotion estimation unit 130 extracts a feature amount of a face of the user from the captured image in which the user is shown, and estimates an emotion based on the extracted feature amount and data indicating a relationship between the feature amount and the emotion. For example, the data indicating the relationship between the feature amount and the emotion may be stored in advance in a storage device (not illustrated) included in the virtual space providing device 100, or may be stored in advance by an external device capable of communicating with the virtual space providing device 100. Note that the estimation of the emotion is not limited to this example. In this manner, the emotion estimation unit 130 estimates the emotion of the user based on the captured image captured to show the user by the image capturing device. The emotion estimation unit 130 is an example of an emotion estimation means.

Next, an example of an operation of the virtual space providing device 100 will be described with reference to FIG. 4. Note that, in the present disclosure, each step in a flowchart is represented by a number assigned to each step, such as "S1".

Figure 4:
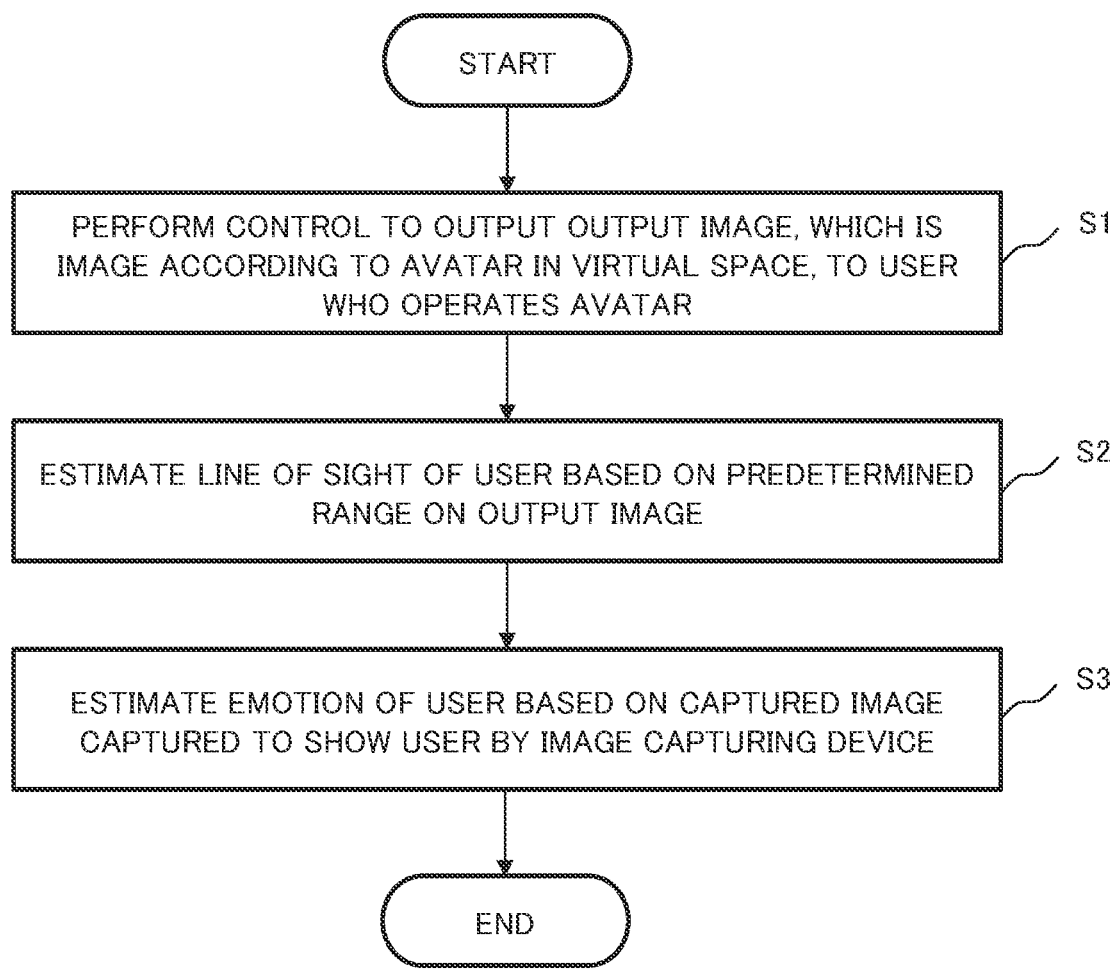
FIG. 4 is a flowchart illustrating an example of an operation of the virtual space providing device according to the first example embodiment of the present disclosure.

FIG. 4 is a flowchart illustrating an example of an operation of the virtual space providing device 100. The output control unit 110 performs control to output an output image, which is an image according to an avatar in a virtual space, to the user who operates the avatar (S1). The line-of-sight estimation unit 120 estimates a line of sight of the user based on a predetermined range on the output image (S2). Then, the emotion estimation unit 130 estimates the emotion of the user based on a captured image captured to show the user by the image capturing device (S3).

As described above, the virtual space providing device 100 according to the first example embodiment performs control to output an output image, which is an image according to an avatar in a virtual space, to a user who operates the avatar, estimates a line of sight of the user based on a predetermined range on the output image, and estimates an emotion of the user based on a captured image captured to show the user by an image capturing device. As a result, the virtual space providing device 100 can estimate an emotion of the user, for example, toward a target to which the line of sight of the user is directed. At this time, the virtual space providing device 100 can also estimate, for example, that the line of sight of the user is directed to a predetermined range on the image. That is, the virtual space providing device 100 does not need to perform image processing on the image in which the user is shown in order to estimate a line of sight. As described above, the virtual space providing device 100 according to the first example embodiment can estimate an emotion of a user who uses a virtual space toward a specific target while suppressing a calculation load.

Second Example Embodiment

Next, a virtual space providing device according to a second example embodiment will be described. In the second example embodiment, the virtual space providing device 100 described in the first example embodiment will be described in more detail.

[Details of Virtual Space Providing Device 100]

Figure 5:
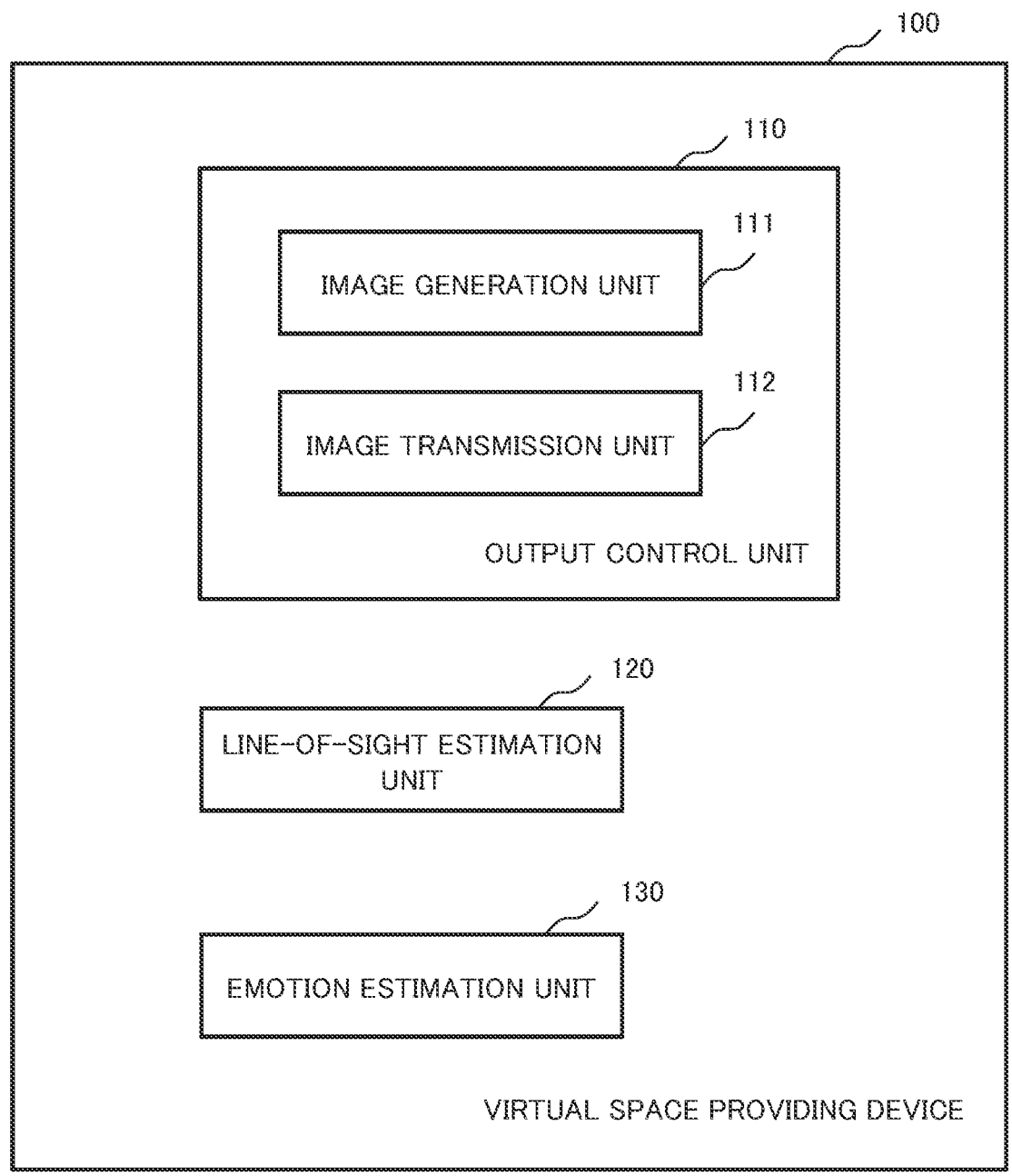
FIG. 5 is a block diagram illustrating an example of a functional configuration of a virtual space providing device according to a second example embodiment of the present disclosure.

FIG. 5 is a block diagram illustrating an example of a functional configuration of a virtual space providing device 100 according to the second example embodiment. As illustrated in FIG. 5, the virtual space providing device 100 includes an output control unit 110, a line-of-sight estimation unit 120, and an emotion estimation unit 130.

The output control unit 110 includes an image generation unit 111 and an image transmission unit 112. The image generation unit 111 generates an output image. First, the image generation unit 111 determines a field of view of an avatar according to a detected orientation of the avatar. Here, the orientation of the avatar is, for example, an orientation of a face of the avatar, but is not limited thereto. An image from an avatar viewpoint operated by the user is displayed on the user terminal 200. That is, in a case where a part of the avatar is a camera, a virtual space shown in the camera is displayed on the user terminal 200. Therefore, the image generation unit 111 may set an orientation of the part of the avatar, which is the camera, as the orientation of the avatar. That is, in a case where a part of the avatar is a camera, the image generation unit 111 determines a range in the virtual space shown in the camera according to the orientation of the avatar. Then, the image generation unit 111 generates an output image in which the determined range in the virtual space is shown. In this manner, the image generation unit 111 generates an output image that is an image from the viewpoint of the avatar, showing the inside of the virtual space.

The image transmission unit 112 transmits the generated output image to the user terminal 200. The image transmission unit 112 transmits the output image to a display device such as the user terminal 200 including a display or the like, thereby displaying the output image on the display device. In this manner, the image transmission unit 112 transmits the generated output image to the display device used by the user.

The line-of-sight estimation unit 120 estimates a line of sight of the user based on the output image. Specifically, the line-of-sight estimation unit 120 estimates that the line of sight of the user is directed to a predetermined range of the output image. The predetermined range refers to a range defined in advance on the output image.

Figure 6A:
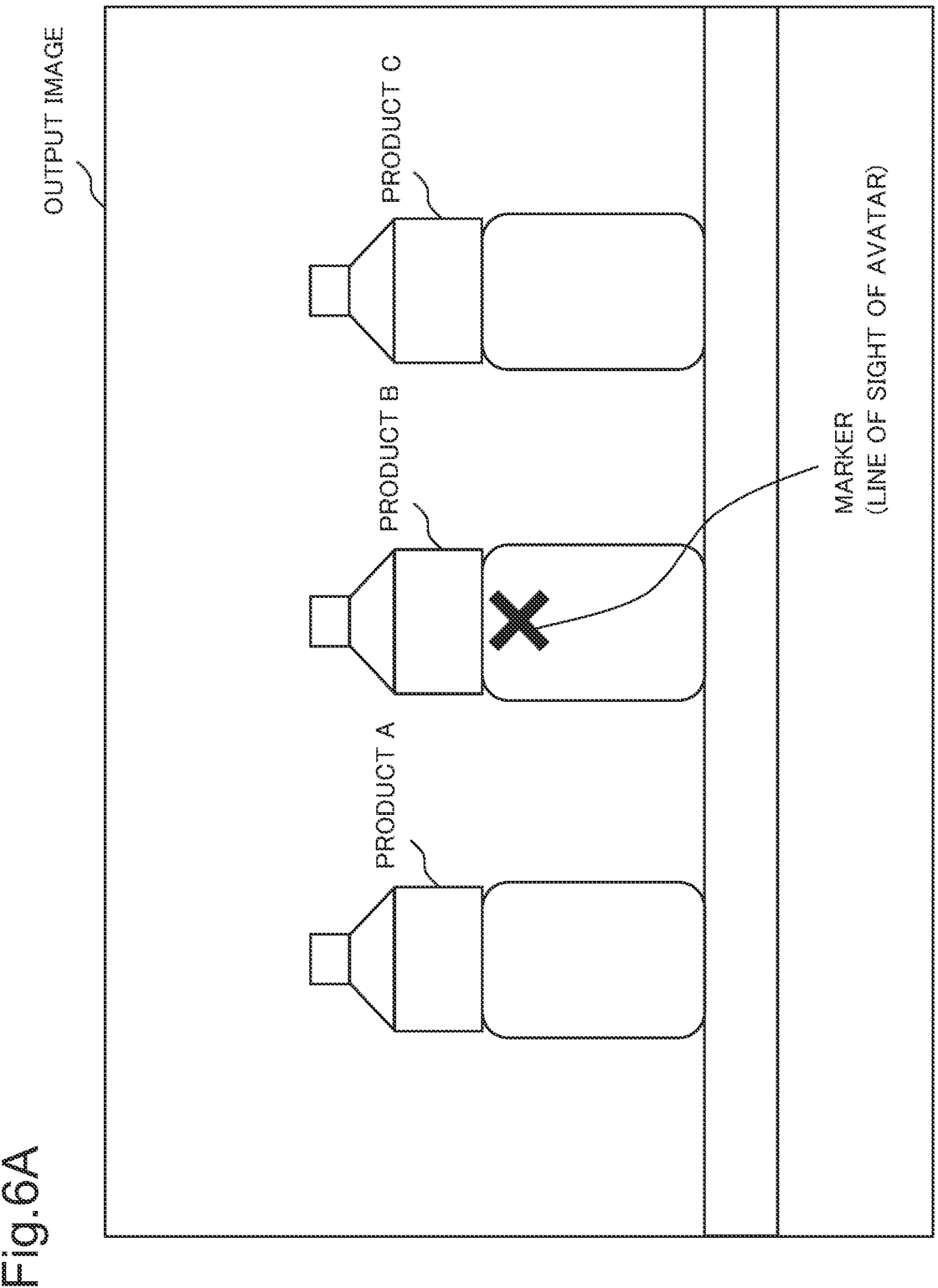
FIG. 6A is a diagram illustrating an example of an output image according to a second example embodiment of the present disclosure.

FIG. 6A is a diagram illustrating an example of the output image. The output image is an image from a predetermined avatar viewpoint. In the output image of FIG. 6A, a product shelf on which product A, product B, and product C are arranged is shown. Furthermore, in the example of FIG. 6A, as an example of the predetermined range, a marker indicating a destination of the line of sight of the avatar is defined at the center of the output image. For example, the line-of-sight estimation unit 120 estimates that the line of sight of the user is directed to the position of the marker on the image. At this time, the line-of-sight estimation unit 120 may estimate that the user is gazing at an object shown at the position of the marker. In the example of FIG. 6, the line-of-sight estimation unit 120 may estimate that the user is gazing at product B. The object shown in the predetermined range may be referred to as a gaze object. The line-of-sight estimation unit 120 may estimate that the line of sight of the user is directed to the gaze object, which is an object shown in the predetermined range.

Note that the position of the marker may not be the center of the image. The position of the marker can be defined as any position. Further, the marker may not be superimposed on the output image displayed on the user terminal 200. In this case, the line-of-sight estimation unit 120 may estimate that the user is gazing at an object shown in a predetermined range, the predetermined range being a location defined in advance as a destination of the line of sight of the avatar on the output image. In this manner, the line-of-sight estimation unit 120 may estimate a line of sight of the user based on the predetermined range according to the line of sight of the avatar.

The predetermined range is not limited to the above-described example. FIG. 6B is a diagram illustrating another example of the output image. In the example of FIG. 6B, a range of interest is defined as the predetermined range at the center of the output image. For example, the line-of-sight estimation unit 120 estimates that the line of sight of the user is directed to the range of interest. At this time, the line-of-sight estimation unit 120 may estimate that the user is gazing at an object shown within the range of interest. In a case where a plurality of objects are shown in the range of interest, the line-of-sight estimation unit 120 may estimate that the user is gazing at the plurality of objects, or may estimate that the user is gazing at one of the plurality of objects. Here, in the example of FIG. 6, product A, product B, and product C are shown in the range of interest. In this case, the line-of-sight estimation unit 120 may estimate that the user is gazing at product B, which is an object closer to the center of the range of interest. Note that the size, shape, and position of the range of interest are not limited to this example. The range of interest may be defined as being of any size, any shape, and any position in the output image.

The emotion estimation unit 130 acquires a captured image captured by the image capturing device included in the user terminal 200, and estimates an emotion of the user shown in the captured image. For example, the emotion estimation unit 130 extracts a feature amount from an area in which the face of the user is shown of the captured image. Then, the emotion estimation unit 130 estimates an emotion based on the extracted feature amount and data indicating a relationship between the feature amount and the emotion. The data indicating the relationship between the feature amount and the emotion may be stored in advance in a storage device (not illustrated) included in the virtual space providing device 100. In addition, the data indicating the relationship between the feature amount and the emotion may be stored in an external device communicably connected to the virtual space providing device 100. The estimated emotion is an emotion defined in advance, such as "happy", "angry", "sad", "enjoying", "impatient", or "nervous". Furthermore, in a case where a characteristic emotion cannot be estimated from the user, the emotion estimation unit 130 may estimate "calm" indicating that the user is calm. Furthermore, the emotion estimation unit 130 may estimate an action caused by the emotion, such as "laughing" or "crying". Note that these are examples of estimated emotions, and other emotions may be estimated.

Note that the method of estimating the emotion of the user from the captured image may be, for example, a method of estimation using pattern matching between the area on the captured image in which the face of the user is shown and an image registered in an image database in association with information indicating a human emotion. At this time, the image database is stored in, for example, a storage device (not illustrated) of the virtual space providing device 100. Furthermore, the method of estimating the emotion of the user from the captured image may be a method in which a feature amount of the user is extracted from an area on the captured image in which the face of the user is shown, and an emotion corresponding to the feature amount of the user is output using an estimation model such as a neural network to which the extracted feature amount is input. In this manner, the emotion estimation unit 130 estimates an emotion of the user based on the captured image in which the user is shown.

For example, it is assumed that a line of sight of the user is estimated by the line-of-sight estimation unit 120, and an object gazed at by the user is specified. In this case, the emotion estimated by the emotion estimation unit 130 can be an emotion toward the gaze object. In the example of FIG. 6A, it is assumed that the line-of-sight estimation unit 120 estimates that the user is gazing at product B, and the emotion estimation unit 130 estimates "happy" as the emotion of the user. In this case, it can be seen that the user shows a positive reaction to product B.

Figure 7:
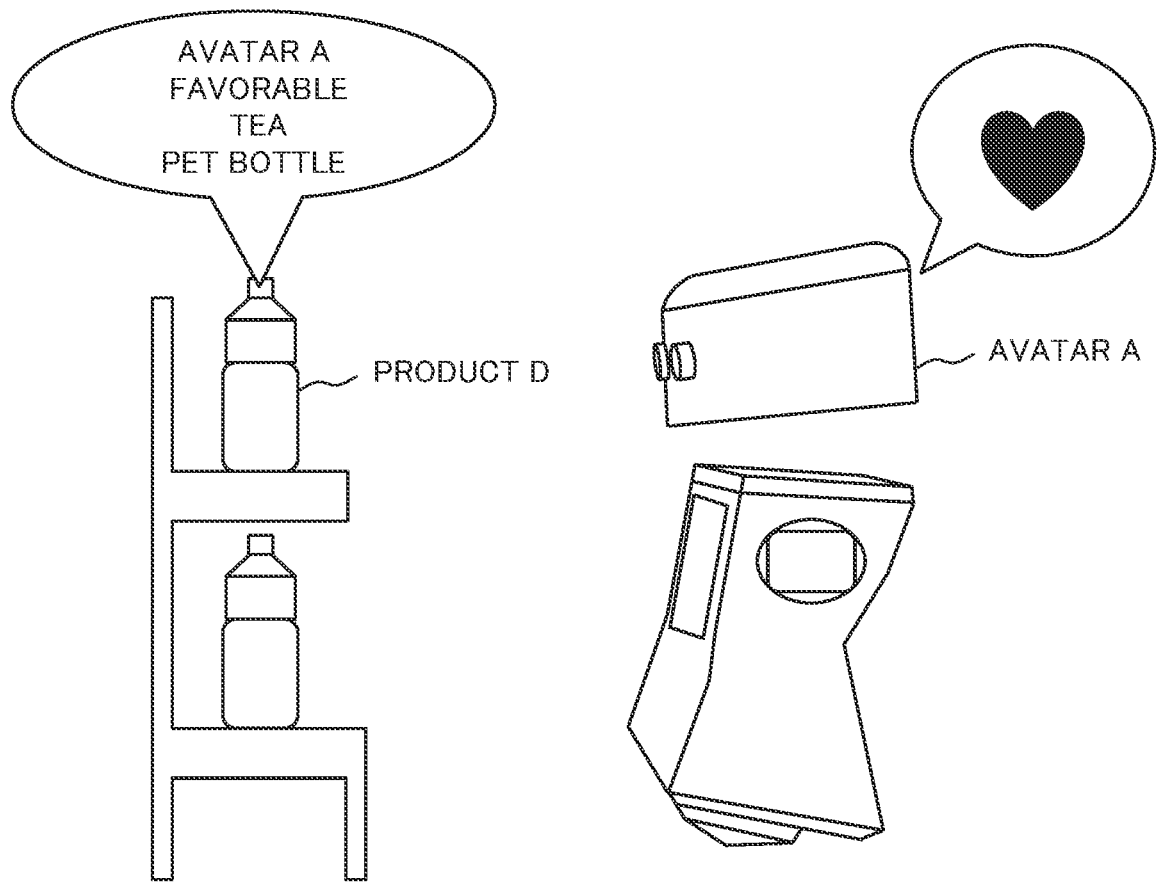
FIG. 7 is a diagram illustrating an example of a mode in which an object is displayed according to the second example embodiment of the present disclosure.

The emotion estimation unit 130 may store information in which the gaze object is associated with the emotion of the user. Furthermore, the emotion estimation unit 130 may add emotion information indicating the estimated emotion of the user to the avatar operated by the user. At this time, the emotion estimation unit 130 may add a character, a symbol, a color, or the like according to the emotion to the avatar as the emotion information. FIG. 7 is a diagram illustrating an example of a mode in which an object is displayed. In the example of FIG. 7, it is assumed that the user of avatar A is estimated to have a favorable reaction to product D. In this case, the emotion estimation unit 130 adds a heart mark to avatar A as the emotion information. Not limited thereto, the emotion estimation unit 130 may change the expression of the avatar or change the shape of the avatar according to the emotion. Furthermore, in a case where the emotion information is added to the avatar, the emotion estimation unit 130 may further add information indicating what the emotion is toward to the avatar. For example, in the example of FIG. 7, information indicating the user is favorable to product D may be added to avatar A. Furthermore, the emotion estimation unit 130 may add emotion information indicating the estimated emotion of the user to the gaze object. In the example of FIG. 7, character information indicating that user A is positive is added to product D.

Example of Operation of Virtual Space Providing Device 100

Figure 8:
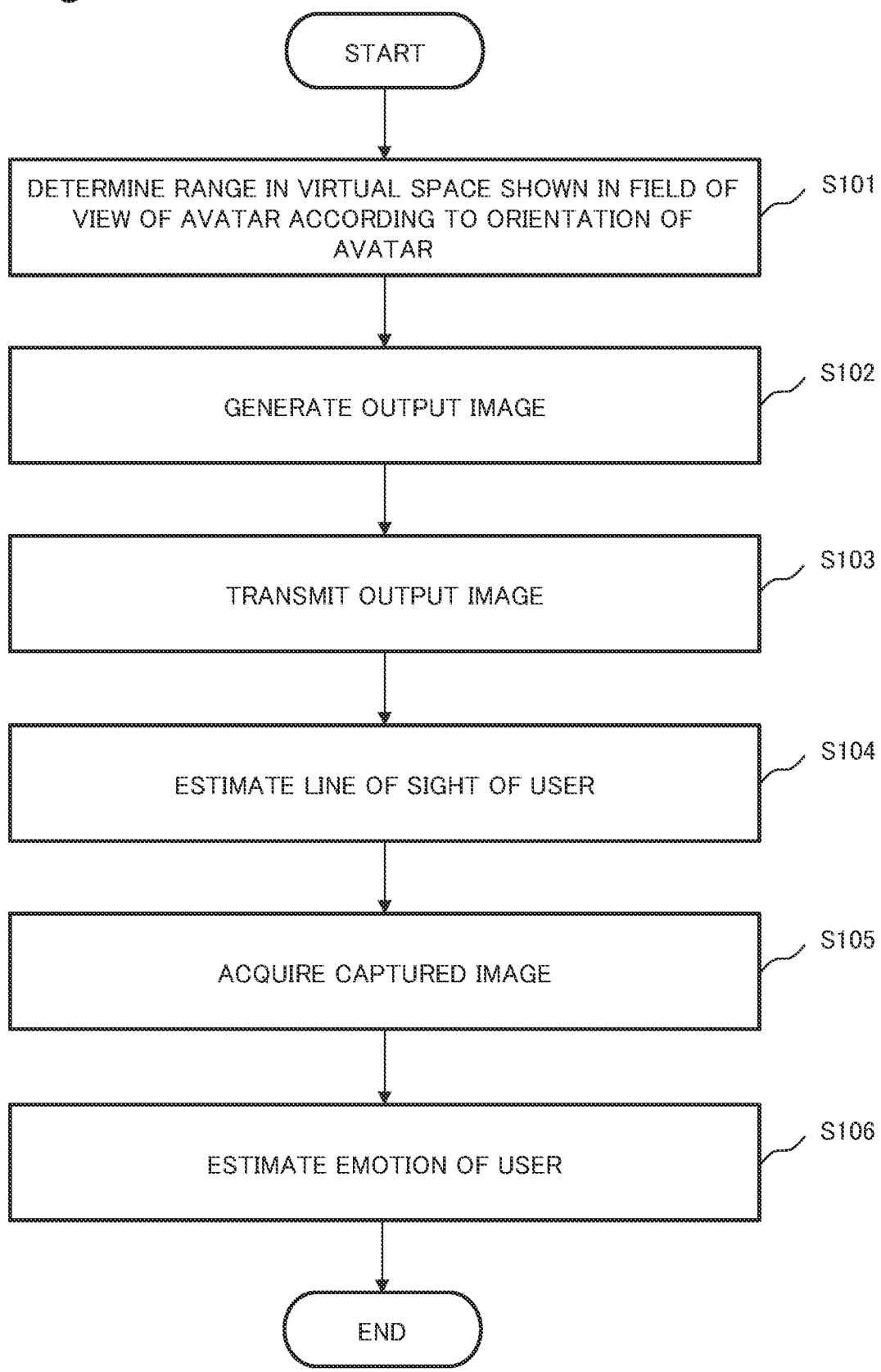
FIG. 8 is a flowchart illustrating an example of an operation of the virtual space providing device according to the second example embodiment of the present disclosure.

Next, an example of an operation of the virtual space providing device 100 according to the second example embodiment will be described with reference to FIG. 8. FIG. 8 is a flowchart illustrating an example of an operation of the virtual space providing device 100. Specifically, FIG. 8 illustrates an example of an operation of the virtual space providing device 100 when estimating an emotion of a user.

First, the image generation unit 111 determines a range in a virtual space shown in a field of view of an avatar according to an orientation of the avatar (S101). The image generation unit 111 generates an output image showing the inside of the virtual space based on the determined range (S102). The image transmission unit 112 transmits the generated output image to the user terminal 200 (S103). The line-of-sight estimation unit 120 estimates a line of sight based on the predetermined range of the output image (S104). For example, the line-of-sight estimation unit 120 estimates that the user is gazing at an object shown in a range of interest of the output image. The emotion estimation unit 130 acquires a captured image captured to show a face of the user by the image capturing device of the user terminal 200 (S105). Then, the emotion estimation unit 130 estimates the emotion of the user based on the captured image (S106).

Note that this operation is an example, and the operation of the virtual space providing device 100 is not limited to this example. For example, the processing of S105 may be performed at any time, and the processing of S106 may be performed using the captured image when an object gazed at by the user is specified.

As described above, the virtual space providing device 100 according to the second example embodiment performs control to output an output image, which is an image according to an avatar in a virtual space, to a user who operates the avatar, estimates a line of sight of the user based on a predetermined range on the output image, and estimates an emotion of the user based on a captured image captured to show the user by an image capturing device. As a result, the virtual space providing device 100 can estimate an emotion of the user, for example, toward a target to which the line of sight of the user is directed. At this time, the virtual space providing device 100 can also estimate, for example, that the line of sight of the user is directed to a predetermined range on the image.

Here, as a method of estimating the line of sight of the user, a method in which the face of the user is captured with a camera and a line of sight from the captured face of the user can be considered. As compared with such a method, the virtual space providing device 100 does not need to perform image processing on the image in which the user is shown. Therefore, the virtual space providing device 100 can reduce the calculation load resulting from the image processing related to the estimation of the line of sight. That is, the virtual space providing device 100 according to the second example embodiment can estimate an emotion of a user who uses a virtual space toward a specific target while suppressing a calculation load.

Furthermore, in the second example embodiment, the predetermined range is defined at a specific position on the image in the output image, and the virtual space providing device 100 may estimate that the line of sight of the user is directed to the gaze object, which is an object shown in the predetermined range. Furthermore, in the second example embodiment, the output image is an image showing the virtual space based on the viewpoint from the avatar, and the virtual space providing device 100 may estimate a line of sight of the user based on the predetermined range according to the line of sight of the avatar. As described above, the virtual space providing device 100 can estimate a line of sight of the user based on the positional relationship of the object on the output image and the line of sight of the avatar, and thus, it is possible to suppress a calculation load related to the estimation of the line of sight.

[First Modification]

In the above-described example embodiment, an example has been described in which the processing of estimating the line of sight and the processing of estimating the emotion are performed by the virtual space providing device 100. The processing of estimating the line of sight and the processing of estimating the emotion may be performed by, for example, the user terminal 200. In other words, the line-of-sight estimation unit 120 and the emotion estimation unit 130 may be provided in the user terminal 200. For example, the user terminal 200 estimates a line of sight of the user based on the predetermined range of the output image. Then, the user terminal 200 may transmit information regarding the estimated line of sight of the user to the virtual space providing device. In addition, for example, the user terminal 200 captures the face of the user, and estimates an emotion of the user based on the captured image. Then, the user terminal 200 may transmit information indicating the estimated emotion of the user to the virtual space providing device 100.

[Second Modification]

The output control unit 110 may display the information regarding the gaze object to be superimposed on the output image. Specifically, it is assumed that a line of sight of the user is estimated by the line-of-sight estimation unit 120, and a gaze object gazed at by the user is specified. At this time, the image generation unit 111 may generate an image in which information regarding the gaze object is superimposed on the output image. Then, the image transmission unit 112 transmits, to the user terminal 200, the image in which information regarding the gaze object is superimposed on the output image.

Figure 9:
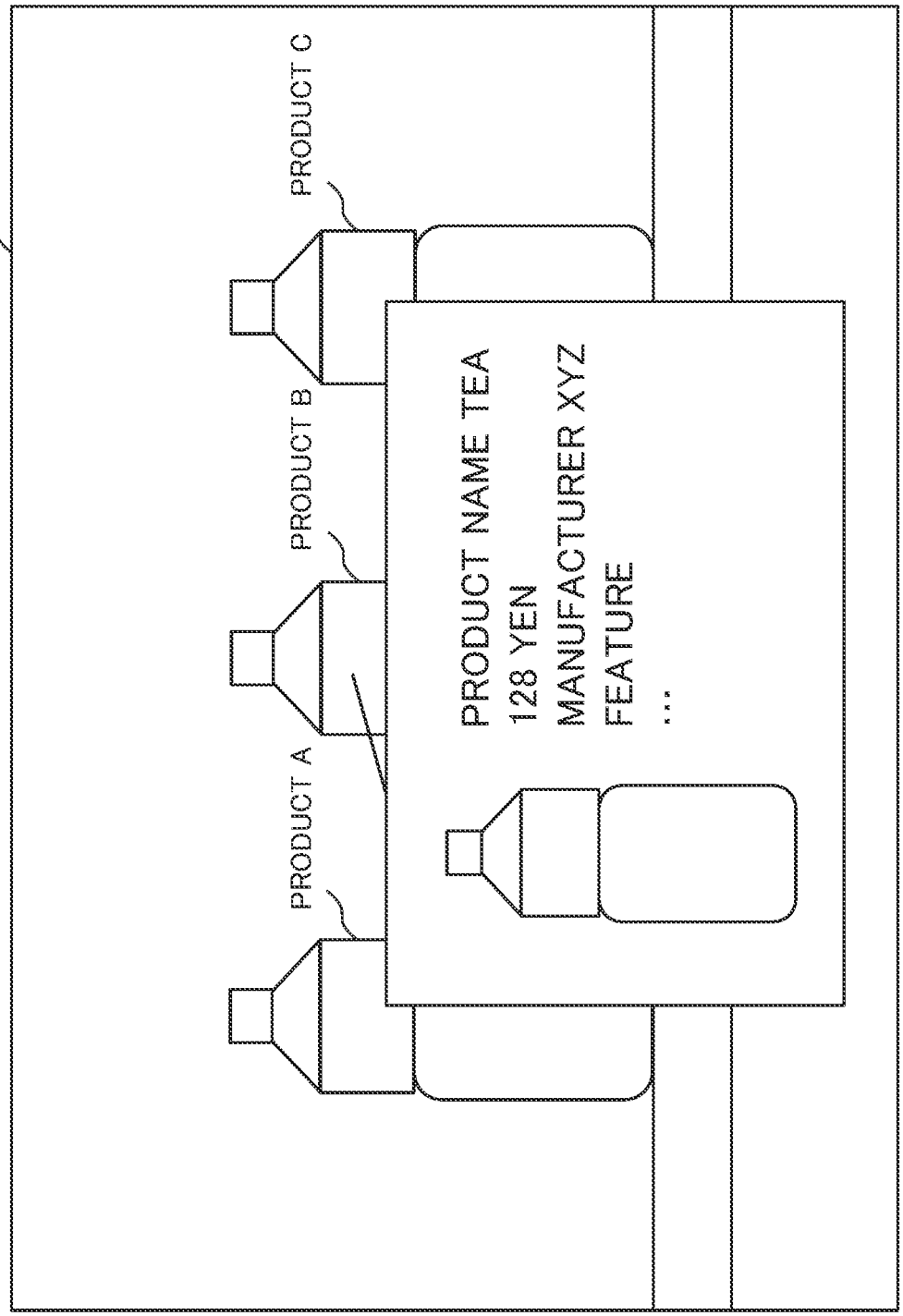
FIG. 9 is a diagram illustrating an example of an output image according to a second modification of the present disclosure.

FIG. 9 is a diagram illustrating an example of the output image. Specifically, FIG. 9 is an image in which information regarding product B is superimposed on the output image of FIG. 6A. In the example of FIG. 9, a product name, a price, a manufacturer, and a feature of product B are described. Such information regarding the object may be stored in, for example, a storage device (not illustrated) included in the virtual space providing device 100 or an external device communicable with the virtual space providing device 100.

As described above, in a case where the gaze object is specified, the output control unit 110 may superimpose information regarding the gaze object on the output image.

Third Example Embodiment

Next, a virtual space providing device according to a third example embodiment will be described. In the third example embodiment, processing regarding an operation of the user will be mainly described. Some descriptions overlapping with those of the first example embodiment and the second example embodiment will be omitted.

[Details of Virtual Space Providing Device 101]

Figure 10:
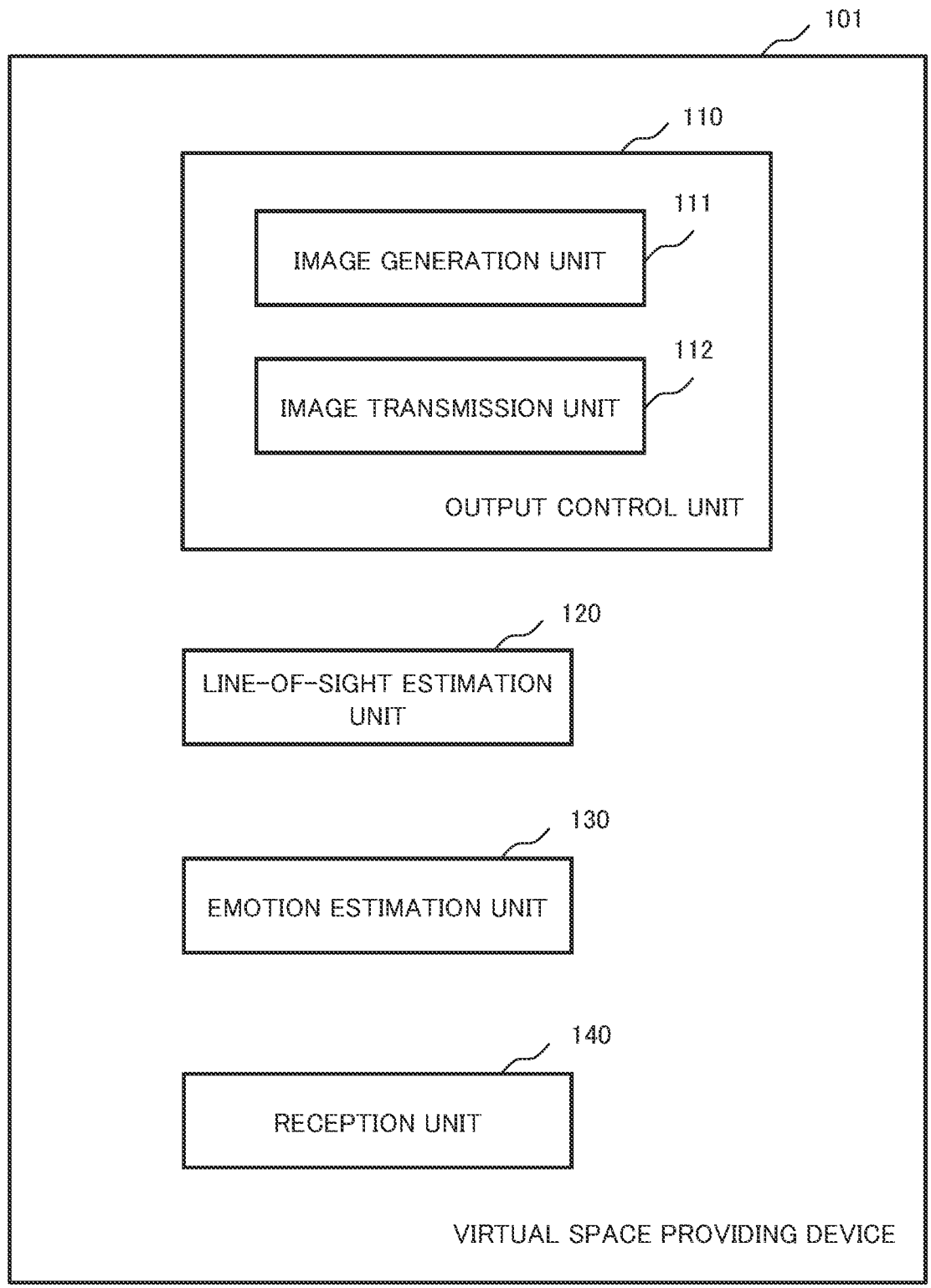
FIG. 10 is a block diagram illustrating an example of a functional configuration of a virtual space providing device according to a third example embodiment of the present disclosure.

FIG. 10 is a block diagram illustrating an example of a functional configuration of a virtual space providing device 101 of the third example embodiment. Similarly to the virtual space providing device 100, the virtual space providing device 101 is communicably connected to a plurality of user terminals 200 via a wireless or wired network.

As illustrated in FIG. 10, the virtual space providing device 101 includes an output control unit 110, a line-of-sight estimation unit 120, an emotion estimation unit 130, and a reception unit 140.

The reception unit 140 receives various operations performed by the user. Specifically, the reception unit 140 receives an emotion estimation timing according to an operation of the user. For example, it is assumed that a button is displayed on the display device of the user terminal 200. At this time, it is assumed that the user has pressed the displayed button using a device such as a mouse. The reception unit 140 may receive a timing at which the button is pressed as the emotion estimation timing. As the button is pressed, the line-of-sight estimation unit 120 estimates a line of sight, and the emotion estimation unit 130 estimates an emotion. Note that, in this case, the line-of-sight estimation unit 120 estimates a line of sight toward another avatar shown in the output image displayed on the user terminal 200 of the user who has pressed the button. That is, the line-of-sight estimation unit 120 estimates a line of sight of another user who operates another avatar. Similarly, the emotion estimation unit 130 estimates an emotion of another user. In this manner, the reception unit 140 receives an emotion estimation timing. The reception unit 140 is an example of a reception means.

Note that the operation performed by the user for the emotion estimation timing is not limited to the above-described example. For example, the reception unit 140 may receive a timing at which the user presses a specific key or a physical button in a device such as a keyboard as the emotion estimation timing. Furthermore, the reception unit 140 may receive a specific date and time input by the user as the emotion estimation timing. Furthermore, in a case where an input for periodically acquiring an emotion is performed by the user, the reception unit 140 may receive the input so that the emotion estimation timing is periodic.

Furthermore, the reception unit 140 may receive settings related to a predetermined range from the user terminal 200. The settings related to the predetermined range are, for example, a position, a size, a shape, and the like on the output image. The reception unit 140 receives, from the user terminal 200, setting information including at least one of the position, the size, and the shape of the predetermined range input by the user. Then, the reception unit 140 sets a predetermined range based on the received setting information. In this manner, the reception unit 140 receives a setting of at least one of the position, the size, and the shape of the predetermined range.

[Example of Operation of Virtual Space Providing Device 101]

Figure 11:
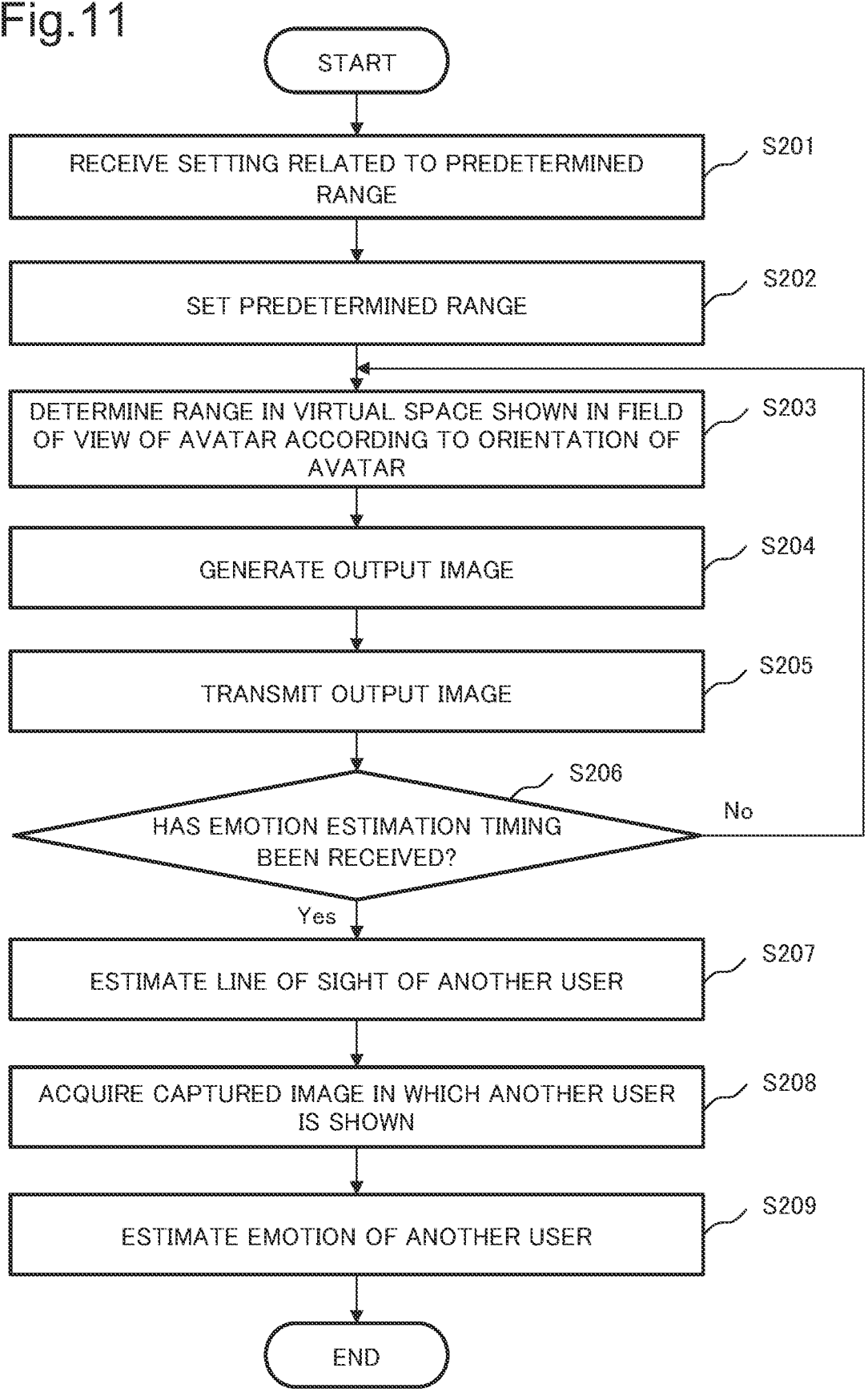
FIG. 11 is a flowchart illustrating an example of an operation of the virtual space providing device according to the third example embodiment of the present disclosure.

Next, an example of an operation of the virtual space providing device 101 according to the third example embodiment will be described with reference to FIG. 11. FIG. 11 is a flowchart illustrating an example of an operation of the virtual space providing device 101. Specifically, FIG. 11 illustrates an example of an operation of the virtual space providing device 101 when estimating an emotion according to a timing specified by the user. Note that, in the present example of the operation, it is assumed that, when the user presses a button on the image, a line of sight and an emotion are estimated with respect to another avatar shown in the output image displayed on the user terminal 200 of the user.

The reception unit 140 receives a setting related to a predetermined range from the user (S201). Specifically, the reception unit 140 receives setting information including at least one of a position, a size, and a shape of the set range from the user terminal 200. Then, the reception unit 140 sets a predetermined range based on the received setting information (S202).

Since the processing of S203 to S205 is similar to the processing of S101 to S103 of FIG. 8, descriptions thereof will be omitted. After the processing of S205, when the reception unit 140 has not received an emotion estimation timing ("No" in S206), the virtual space providing device 101 returns to the processing of S203. When the reception unit 140 has received an emotion estimation timing ("Yes" in S206), the line-of-sight estimation unit 120 estimates a line of sight of another avatar shown in an output image displayed on a user terminal of a user. That is, a line of sight of another user who operates the another avatar is estimated (S207). At this time, the line-of-sight estimation unit 120 estimates the line of sight of the another user based on an output image displayed on a user terminal 200 used by the another user. Then, the emotion estimation unit 130 acquires a captured image in which the another user is shown from an image capturing device included in the user terminal 200 of the another user (S208). Then, the emotion estimation unit 130 estimates an emotion of the another user (S209).

As described above, the virtual space providing device 101 according to the third example embodiment may receive an emotion estimation timing, estimate a line of sight of another user according to the received timing, and estimate an emotion of the another user based on a captured image in which the another user is shown according to the received timing. In a case where lines of sight and emotions of a plurality of users are estimated at all times, there is a possibility that a calculation load and a communication amount increase. In contrast, the virtual space providing device 101 can estimate a line of sight and an emotion according to a timing desired by a user. That is, since a timing for estimating a line of sight and an emotion is restricted, the virtual space providing device 101 can suppress an increase in calculation load and an increase in communication amount.

In addition, the virtual space providing device 101 according to the third example embodiment may receive a setting of at least one of a position, a size, and a shape of the predetermined range. As a result, the virtual space providing device 101 can set the range desired by the user as the predetermined range.

Fourth Example Embodiment

Next, a virtual space providing device according to a fourth example embodiment will be described. In the fourth example embodiment, another example of the output image to be generated will be mainly described. Some descriptions overlapping with those of the first example embodiment, the second example embodiment, and the third example embodiment will be omitted.

[Details of Virtual Space Providing Device 102]

Figure 12:
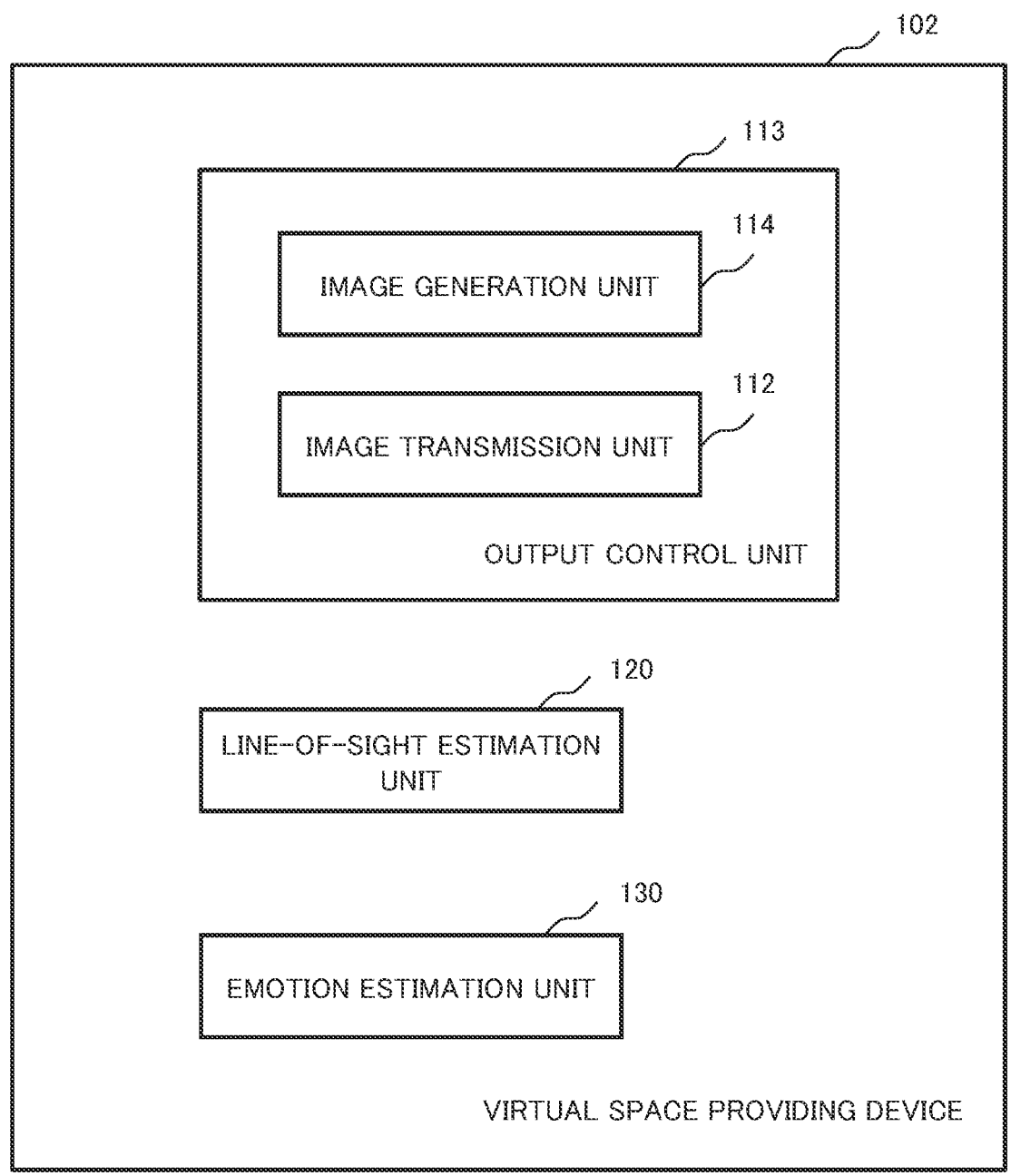
FIG. 12 is a block diagram illustrating an example of a functional configuration of a virtual space providing device according to a fourth example embodiment of the present disclosure.

FIG. 12 is a block diagram illustrating an example of a functional configuration of a virtual space providing device 102 according to the fourth example embodiment. Similarly to the virtual space providing devices 100 and 101, the virtual space providing device 102 is communicably connected to a plurality of user terminals 200 via a wireless or wired network.

As illustrated in FIG. 12, the virtual space providing device 102 includes an output control unit 113, a line-of-sight estimation unit 120, and an emotion estimation unit 130. Note that, in the present example embodiment, although the description of the reception unit 140 is omitted for simplification of explanation, but the virtual space providing device 102 may include a reception unit 140.

The output control unit 113 includes an image generation unit 114 and an image transmission unit 112. The image generation unit 114 performs the following processing in addition to the processing of the image generation unit 111. Specifically, the image generation unit 114 determines a field of view of a target avatar according to an orientation of the avatar. Then, the image generation unit 114 generates an output image of which a display mode is changed outside the predetermined range in which the determined range is shown on the image.

Figure 13:
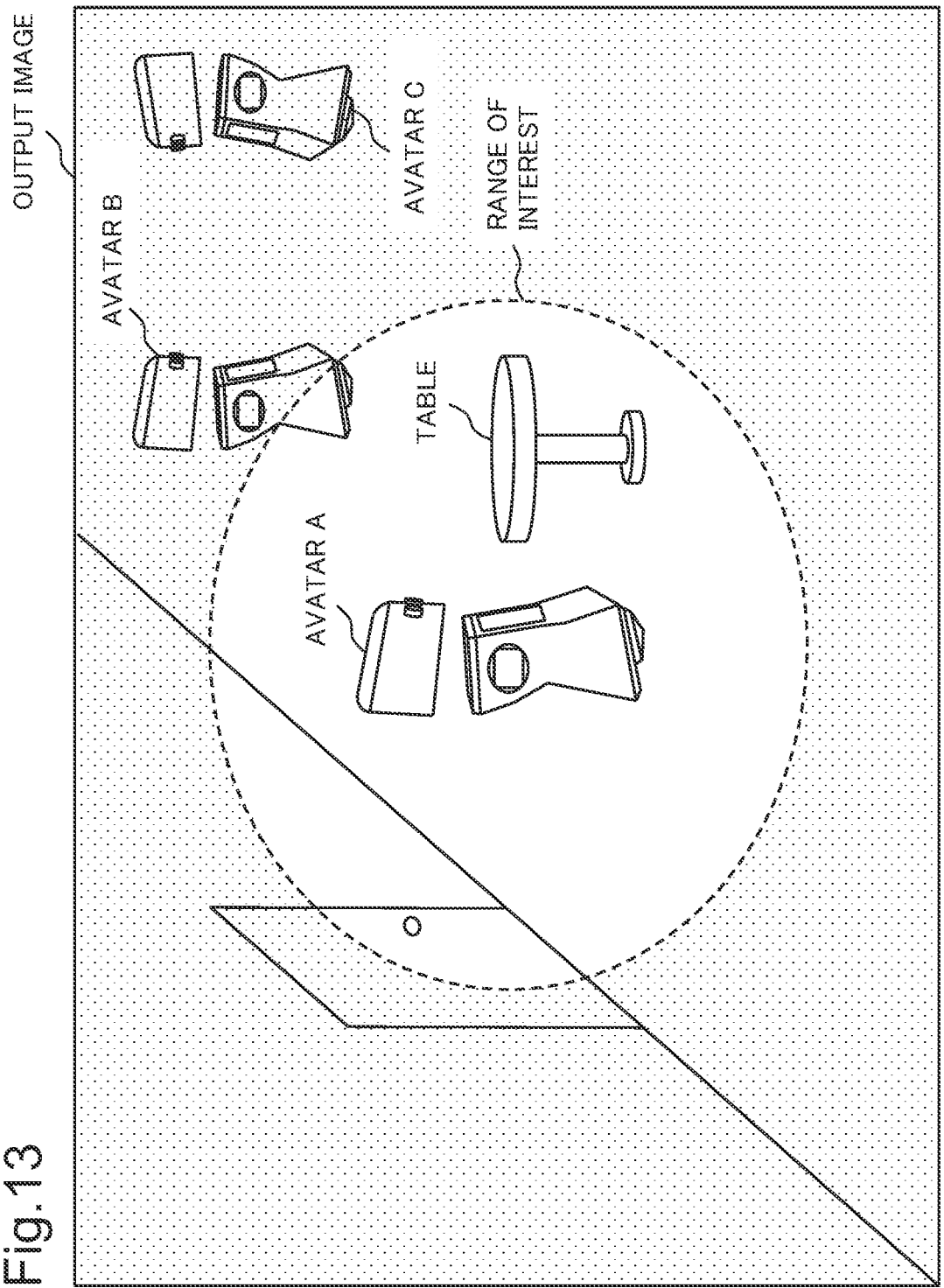
FIG. 13 is a diagram illustrating an example of an output image according to the fourth example embodiment of the present disclosure.

FIG. 13 is a diagram illustrating an example of an output image. The output image is an image from a viewpoint of a target avatar. In the example of FIG. 13, a range of interest is defined as the predetermined range in a range including the center of the output image. A portion hatched outside the range of interest indicates a range in which the display mode is changed. The change of the display mode may refer to, for example, preventing an object outside the range of interest from being shown or displaying an object outside the range of interest in a blurred manner. In the example of FIG. 13, in the output image, avatar A and a table are displayed in a non-blurred manner, and avatar B and avatar C are displayed in a blurred manner.

Here, blurring may be processing of lowering the resolution. In this case, in the example of FIG. 13, the resolution of the hatched portion is lower than the resolution of the non-hatched portion. Not limited to this example, the blurring processing may be, for example, color-lightening processing, contrast-lowering processing, or masking processing. For example, in the example of FIG. 13, in a case where color-lightening processing is performed, the color of the hatched portion becomes lighter than the color of the non-hatched portion. Furthermore, in the example of FIG. 13, in a case where contrast-lowering processing is performed, the color contrast of the hatched portion is lower than the color contrast of the non-hatched portion. Furthermore, in the example of FIG. 13, in a case where masking processing is performed, the masking processing is performed by superimposing another image on the hatched portion. At this time, the image generation unit 114 may generate an output image in which an object at the hatched portion is shown through the another image superimposed thereon.

The image generation unit 114 generates, as an output image, an image from a viewpoint of the avatar, in which the outside of the predetermined range is blurred. Then, the image transmission unit 112 transmits the output image to the user terminal 200. In this manner, the output control unit 113 performs control to output an output image in which the outside of the predetermined range is blurred to the user.

By blurring the outside of the predetermined range as described above, the user may operate the avatar so that a portion that the user wants to see is positioned within the predetermined range that is not blurred. As a result, it is possible to prompt the user to perform an operation such that a portion that the user wants to see is shown within the predetermined range on the output image.

Figure 14:
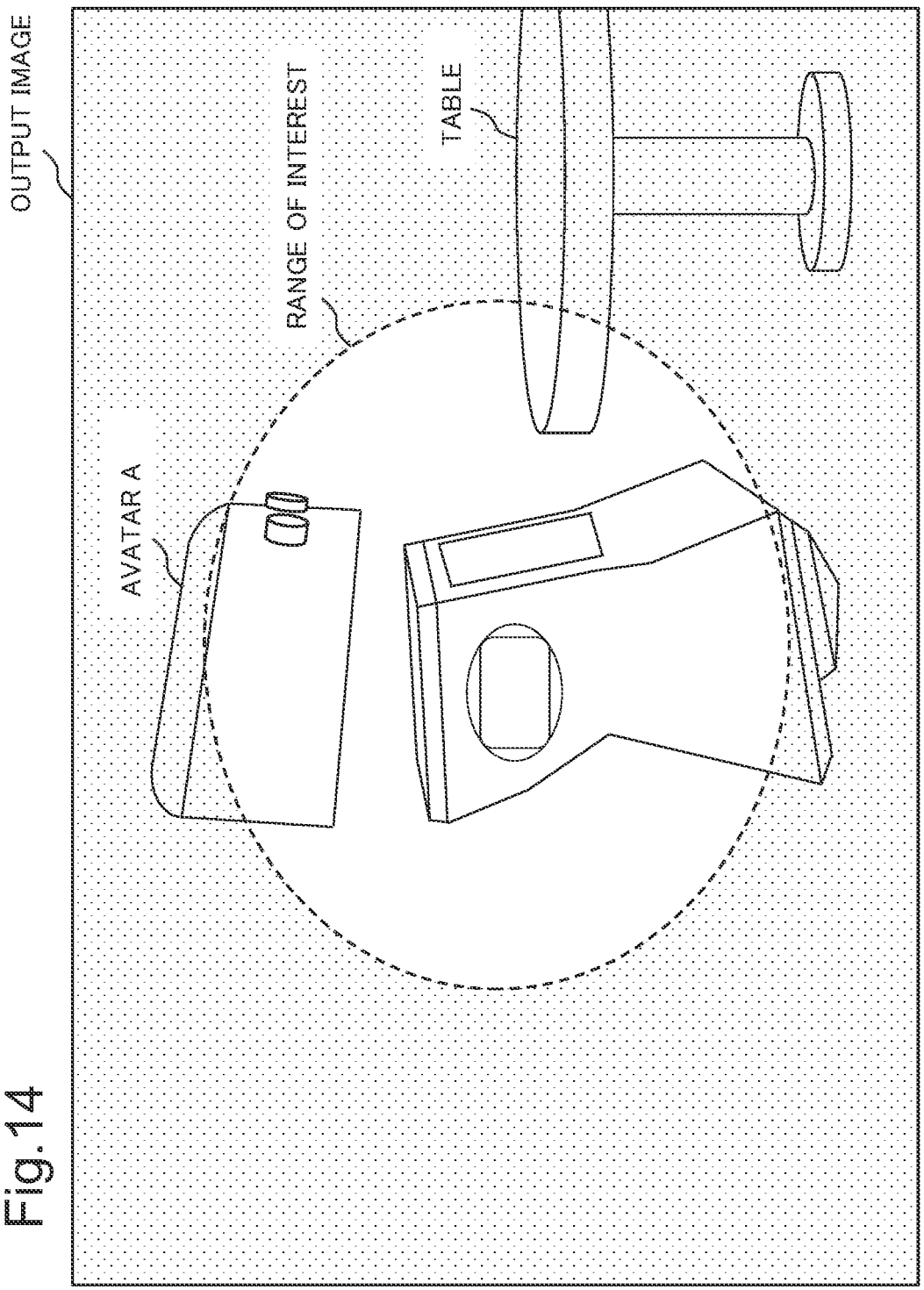
FIG. 14 is a diagram illustrating another example of an output image according to the fourth example embodiment of the present disclosure.

FIG. 14 is a diagram illustrating another example of the output image. In the example of FIG. 14, avatar A is shown near the center of the range of interest, but is also shown to protrude outside the range of interest. There is a high possibility that the user is interested in an object near the center of the range of interest. Therefore, in a case where the object shown at the center of the range of interest is also shown outside the range of interest, the image generation unit 114 may blur a range outside the range of interest, excluding a range in which the object is shown. Note that the image generation unit 114 may perform this processing even if the object is not shown at the center of the range of interest. For example, in a case where an object shown within a range of interest and shown within a predetermined distance from the center of the range of interest is also shown outside the range of interest, the image generation unit 114 may blur a range outside the range of interest, excluding a range in which the object is shown. As described above, in a case where an object is shown within a predetermined distance from the center of the predetermined range is also shown outside the predetermined range, the image generation unit 114 may generate an output image in which a range outside the predetermined range, which is a range not including the object shown within the predetermined distance, is blurred.

[Example of Operation of Virtual Space Providing Device 102]

Figure 15:
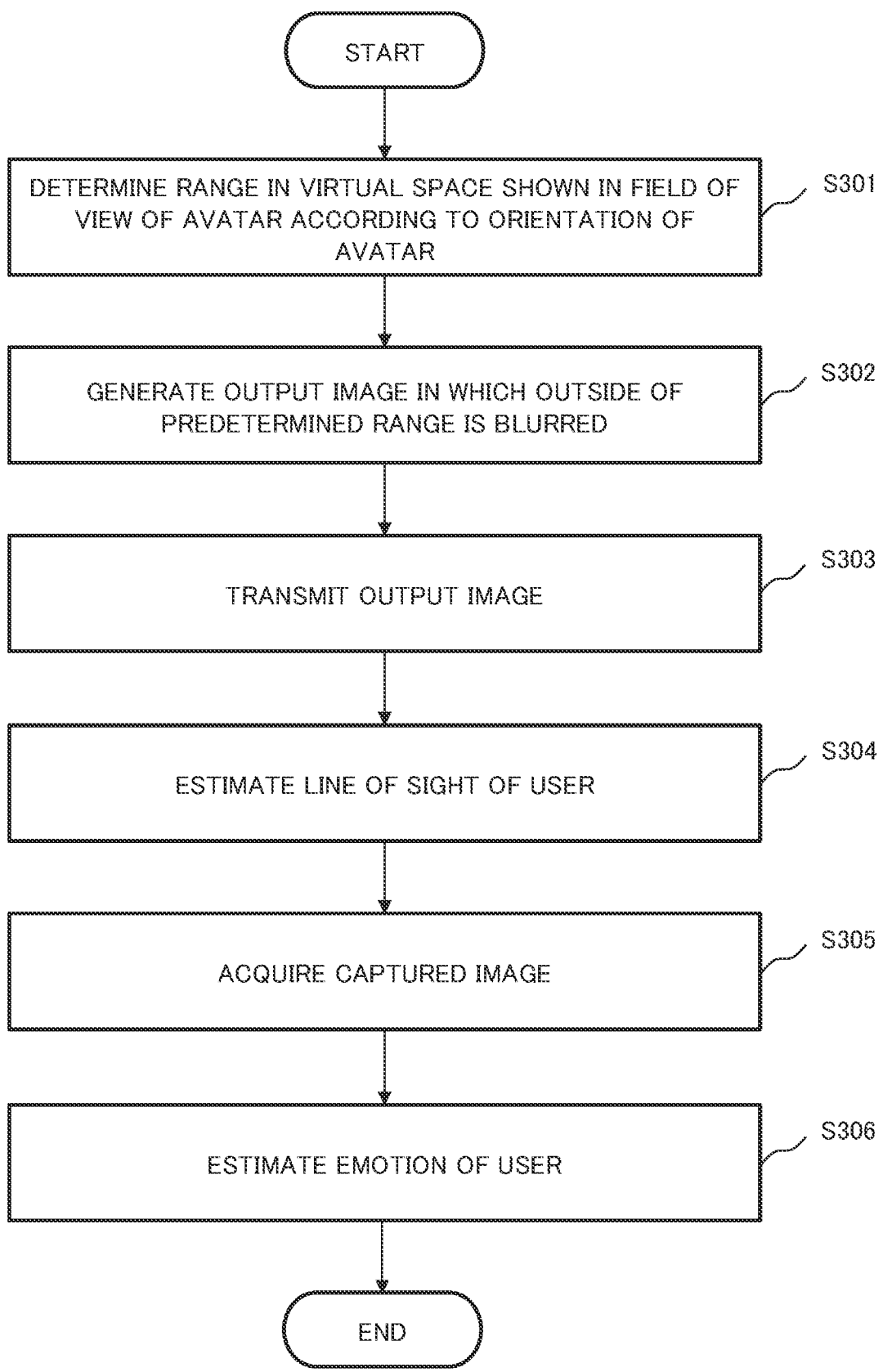
FIG. 15 is a flowchart illustrating an example of an operation of the virtual space providing device according to the fourth example embodiment of the present disclosure.

Next, an example of an operation of a virtual space providing device 102 according to a fourth example embodiment will be described with reference to FIG. 15. FIG. 15 is a flowchart illustrating an example of an operation of the virtual space providing device 102. Specifically, FIG. 15 illustrates an example of an operation of the virtual space providing device 102 when generating an output image of which a partial portion is blurred.

First, the image generation unit 114 determines a range in a virtual space shown in a field of view of an avatar according to an orientation of the avatar (S301). Then, the image generation unit 114 generates an output image in which the determined range is shown and the outside of the predetermined range on the image is blurred (S302). Thereafter, since the processing of S303 to S306 is similar to the processing of S103 to S106 of FIG. 8, descriptions thereof will be omitted.

As described above, the virtual space providing device 102 according to the fourth example embodiment may perform control to output the output image in which the outside of the predetermined range is blurred to the user. A partial portion of the image output to the user is blurred. Therefore, the user operates the avatar, for example, so that the portion that the user wants to see is not blurred. That is, the virtual space providing device 102 can prompt the user to perform an operation such that a portion that the user wants to see is shown at a specific position on the output image. As a result, there is high possibility that the user is looking at a specific position on the output image. Therefore, the virtual space providing device 102 can more accurately estimate a line of sight of the user.

Furthermore, in a case where a plurality of objects are included in the predetermined range, the virtual space providing device 100 according to the fourth example embodiment may estimate that the line of sight of the user is directed to an object closer to the center of the predetermined range. As a result, the virtual space providing device 100 can specify which object the line of sight of the user is directed to.

Furthermore, in a case where an object is shown within a predetermined distance from the center of the predetermined range is also shown outside the predetermined range, the virtual space providing device 100 according to the fourth example embodiment may generate an output image in which a range outside the predetermined range, which is a range not including the object shown within the predetermined distance, is blurred. As a result, the virtual space providing device 100 can prevent a range in which an object that the user is likely to be interested in is shown from being blurred.

[Third Modification]

Although, as an example of a change in the display mode outside the predetermined range, an example in which blurring processing is performed has been mainly described, the change in the display mode is not limited to the above-described example. For example, the image generation unit 114 may generate, as the output image, an image that does not include objects shown outside the range of interest. In this case, the image generation unit 114 may generate an image that does not include all the objects outside the range of interest, or may generate an image that does not include a specific object among the objects outside the range of interest. The specific object may be, for example, an object different from the background, such as another avatar or a screen on the virtual space. Furthermore, in a case where the image generation unit 114 generates an image that does not include an object shown outside the range of interest, the range of interest may be a range formed along the shape of an object present at the center of the image.

Fifth Example Embodiment

Next, a virtual space providing device according to a fifth example embodiment will be described. In the fifth example embodiment, an example in which it is determined whether an avatar operated by a user is permitted to enter a specific region according to an emotion of the user will be mainly described. Some descriptions overlapping with those of the first example embodiment, the second example embodiment, the third example embodiment, and the fourth example embodiment will be omitted.

[Details of Virtual Space Providing Device 103]

Figure 16:
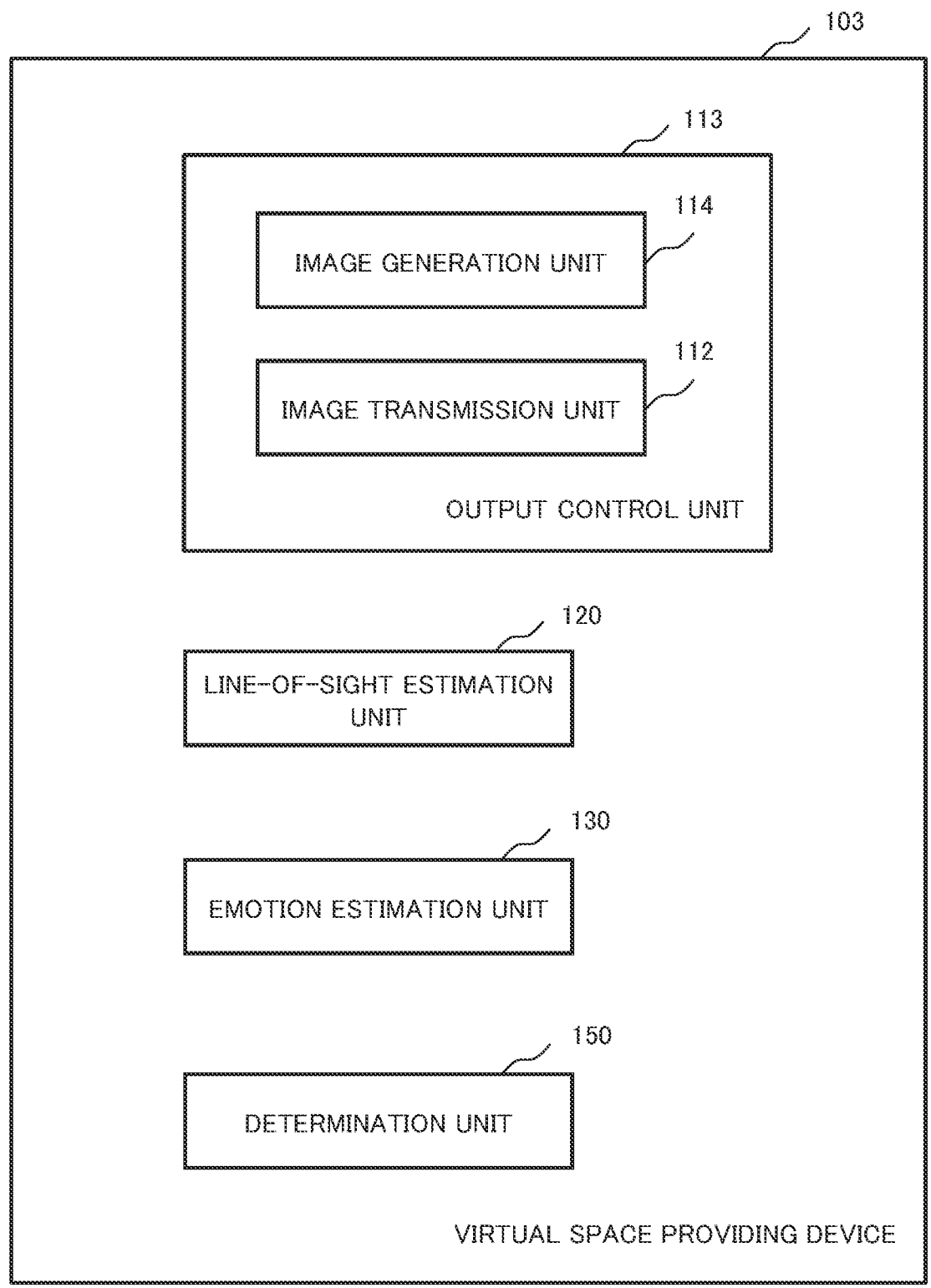
FIG. 16 is a block diagram illustrating an example of a functional configuration of a virtual space providing device according to a fifth example embodiment of the present disclosure.

FIG. 16 is a block diagram illustrating an example of a functional configuration of a virtual space providing device 103 according to the fifth example embodiment. Similarly to the virtual space providing devices 100, 101, and 102, the virtual space providing device 103 is communicably connected to a plurality of user terminals 200 via a wireless or wired network.

As illustrated in FIG. 16, the virtual space providing device 103 includes an output control unit 113, a line-of-sight estimation unit 120, an emotion estimation unit 130, and a determination unit 150. Note that, in the present example embodiment, although the description of the reception unit 140 is omitted for simplification of explanation, but the virtual space providing device 103 may include a reception unit 140.

The determination unit 150 determines whether the avatar is permitted to enter a specific region that is a partial region of the virtual space. At this time, the determination unit 150 may determine whether the avatar that is about to enter the specific region is permitted to enter the specific region based on an emotion of the user who operates the avatar. Specifically, the determination unit 150 sets a condition for entering the specific region for the specific region. For example, the determination unit 150 sets the specific region to reject an entrance of an avatar used by a user estimated to be "excited". Then, in a case where the emotion estimation unit 130 estimates that the user of the avatar that is about to enter the specific region is "excited", the determination unit 150 rejects an entrance of the avatar. Note that the emotion set for restricting the entrance to the specific region is not limited to this example.

Furthermore, the determination unit 150 may determine whether the avatar that is about to enter the specific region is permitted to enter the specific region based on an emotion of the user operating the avatar toward the specific object.

In this manner, the determination unit 150 determines whether the avatar is permitted to enter the specific region, which is a partial region of the virtual space, based on the estimated emotion of the user. The determination unit 150 is an example of a determination means.

Note that the line-of-sight estimation unit 120 and the emotion estimation unit 130 may perform respective operations when the avatar tries to enter the specific region.

[Example of Operation of Virtual Space Providing Device 103]

Figure 17:
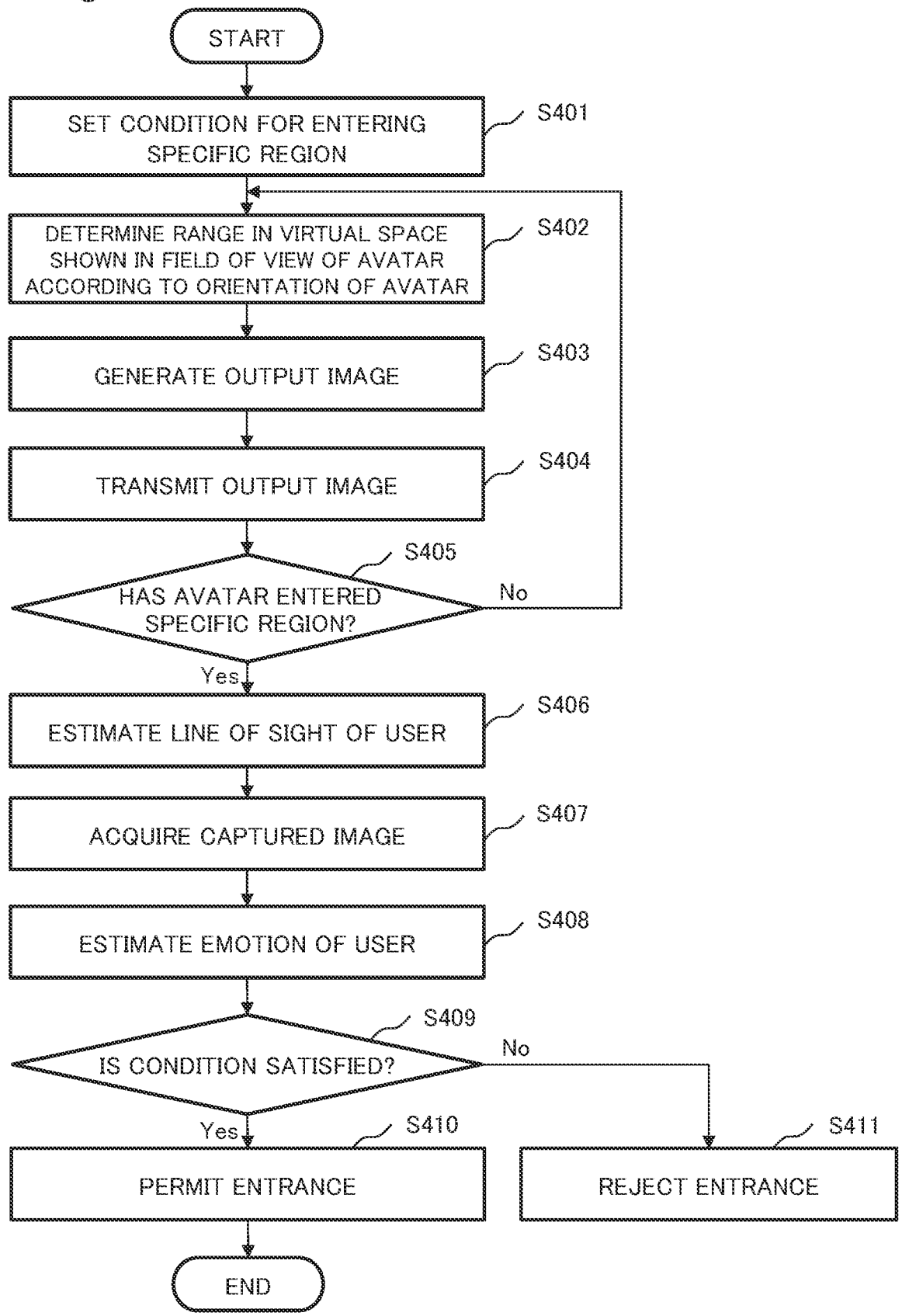
FIG. 17 is a flowchart illustrating an example of an operation of the virtual space providing device according to the fifth example embodiment of the present disclosure.

Next, an example of an operation of the virtual space providing device 103 according to the fifth example embodiment will be described with reference to FIG. 17. FIG. 17 is a flowchart illustrating an example of an operation of the virtual space providing device 103. Specifically, FIG. 17 illustrates an example of an operation of the virtual space providing device 103 when determining whether an avatar that is about to enter a specific region is permitted to enter the specific region.

The determination unit 150 sets a condition for entering a specific region (S401). Since the processing of S402 to S404 is similar to the processing of S101 to S103 of FIG. 8, descriptions thereof will be omitted. The determination unit 150 determines whether the avatar has entered the specific region. When the avatar has not entered the specific region ("No" in S405), the virtual space providing device 103 may repeat the processing of S402 to S404. When the avatar has entered the specific region ("Yes" in S405), the virtual space providing device 103 performs the processing of S406 to S408, in other words, estimates a line of sight and an emotion of a user of the avatar. Since the processing of S406 to S408 is similar to the processing of S104 to S106 of FIG. 8, the details thereof will be omitted. When the estimated emotion of the user satisfies the condition ("Yes" in S409), the determination unit 150 permits the entrance of the avatar (S410). When the estimated emotion of the user does not satisfy the condition ("No" in S409), the determination unit 150 rejects the entrance of the avatar (S410).

Note that the avatar of which the entrance is rejected is, for example, moved to the outside of the specific region by the determination unit 150.

As described above, the virtual space providing device 103 according to the fifth example embodiment may determine whether the avatar is permitted to enter a specific region, which is a partial region of the virtual space, based on the estimated emotion of the user. As a result, the virtual space providing device 103 can restrict the movement of the avatar in the virtual space based on the emotion of the user.

Example of Application Scene

Next, an example of a scene to which the virtual space providing device according to the present disclosure is applied will be described. Note that the following description is merely an example, and the scene to which the virtual space providing device according to the present disclosure is applied is not limited to the following scene.

[Scene 1]

When a company or the like performs telework, employees communicate with each other by, for example, e-mail, chat, or the like. However, it is difficult for an employee to grasp a state of another employee only by e-mail, chat, or the like.

Therefore, in order to perform telework, a virtual office is constructed in a virtual space. For example, a user (employee) communicates with another user in the virtual office through an avatar. At this time, by using the virtual space providing device, the user can know what the another user is looking at and what kind of emotion the another user has toward the target that the another user is looking at. Therefore, the user can cope according to the situation of the another user.

In addition, a person can see what complexion another person has in a real space, but it is difficult to see a complexion of another person has in telework. On the other hand, by using the virtual space providing device, the user can acquire an emotion of another user. Therefore, for example, the user can grasp that another user is in trouble and assist the another user.

[Scene 2]

For example, it is assumed that a seminar is held in a virtual space. In such a case, for example, a user who is a lecturer at the seminar can grasp where users who are audiences are looking during the seminar. Furthermore, the user who is a lecturer can grasp what kind of emotions the audiences have. By using these pieces of information, the user who is a lecturer can obtain, for example, feedback on the content of the lecture. Therefore, the user who is a lecturer can add explanation as necessary, for example, when it is found from the feedback result that the audiences cannot understand the speech very well.

[Scene 3]

For example, it is assumed that a virtual store imitating a real store is constructed in a virtual space. In this case, a user shops in the virtual store using an avatar.

For example, it is assumed that an output image as in the example of FIG. 13 is displayed on the user terminal 200. In this case, the virtual space providing device estimates that the user is interested in product B, and also estimates an emotion of the user toward product B. As a result, an administrator of the virtual store can estimate which user has what kind of emotion toward which product. That is, for example, the administrator can acquire reactions of customers (users) to the content of the product, the description of the product, and the like. Therefore, the administrator can perform analysis for product improvement, review of sales methods, and the like based on the reactions of the customers.

Example of Hardware Configuration of Virtual Space Providing Device

Figure 18:
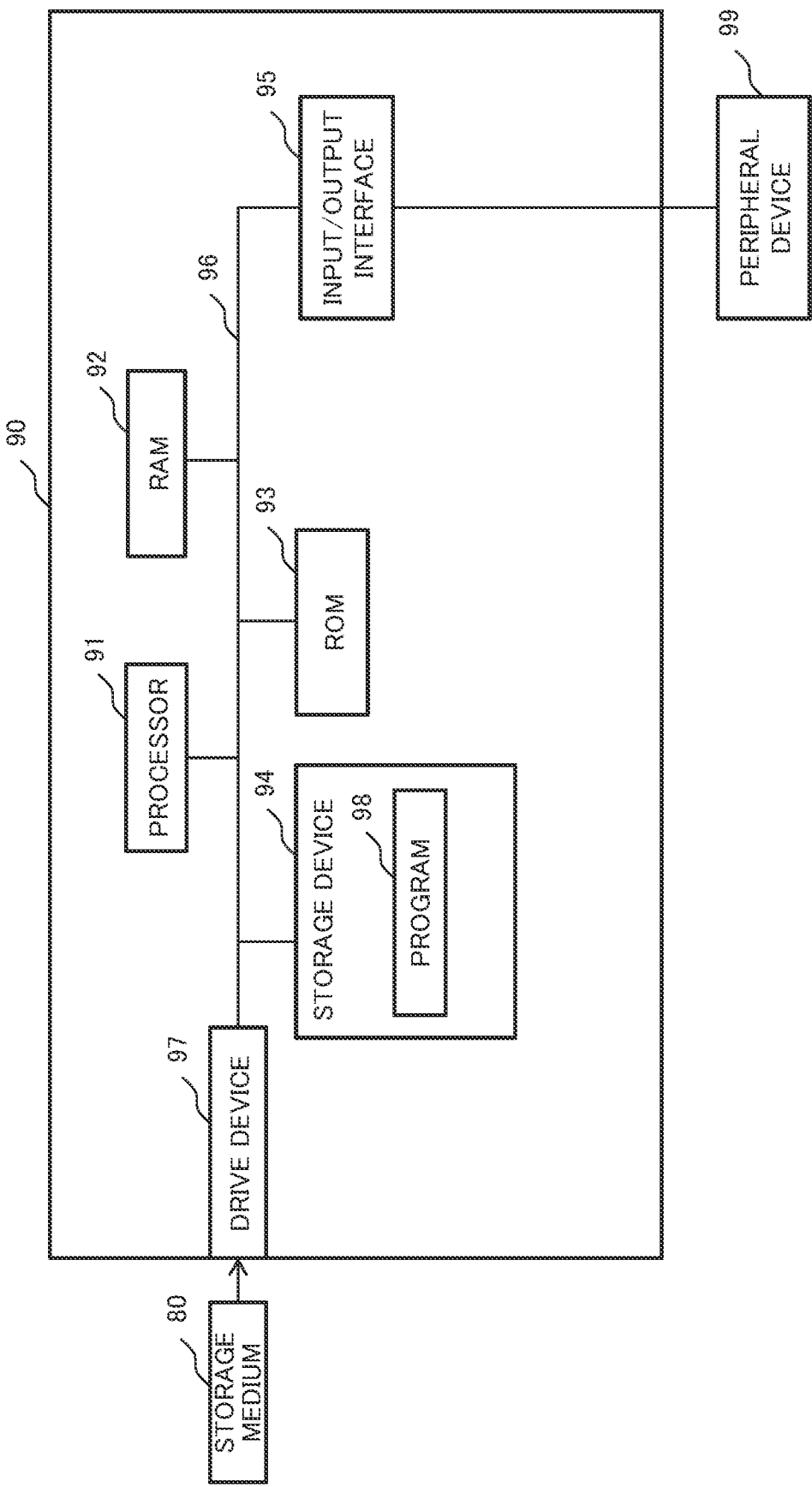
FIG. 18 is a block diagram illustrating an example of a hardware configuration of a computer device for achieving the virtual space providing device according to each of the first, second, third, fourth, and fifth example embodiments of the present disclosure.

Hardware constituting the virtual space providing devices according to each of the first, second, third, fourth, and fifth example embodiments described above will be described. FIG. 18 is a block diagram illustrating an example of a hardware configuration of a computer device for achieving the virtual space providing device according to each of the example embodiments. The virtual space providing device and the virtual space providing method described in each of the example embodiments and the modifications thereof are achieved by the computer device 90.

As illustrated in FIG. 18, the computer device 90 includes a processor 91, a random access memory (RAM) 92, a read only memory (ROM) 93, a storage device 94, an input/output interface 95, a bus 96, and a drive device 97. Note that the virtual space providing device may be achieved by a plurality of electric circuits.

The storage device 94 stores a program (computer program) 98. The processor 91 executes the program 98 of the virtual space providing device using the RAM 92. Specifically, for example, the program 98 includes a program that causes the computer to execute the processing illustrated in FIGS. 8, 11, 15, and 17. As the processor 91 executes the program 98, the functions of the components of the virtual space providing device are achieved. The program 98 may be stored in the ROM 93. In addition, the program 98 may be recorded in a storage medium 80 and read using the drive device 97, or may be transmitted from an external device that is not illustrated to the computer device 90 via a network that is not illustrated.

The input/output interface 95 exchanges data with peripheral devices (keyboard, mouse, display device, etc.) 99. The input/output interface 95 functions as a means for acquiring or outputting data. The bus 96 connects the components to each other.

Note that there are various modifications to the method for achieving the virtual space providing device. For example, the virtual space providing device can be achieved as a dedicated device. Furthermore, the virtual space providing device can be achieved based on a combination of a plurality of devices.

The processing method for causing the storage medium to record a program for achieving each of the components for the function of each of the example embodiments, reading the program recorded in the storage medium as a code, and executing the program in the computer also falls within the scope of each of the example embodiments. That is, a computer-readable storage medium also falls within the scope of each of the example embodiments. In addition, the storage medium in which the above-described program is recorded and the program itself also fall within each of the example embodiments.

Examples of the storage medium include, but not limited to, a floppy (registered trademark) disk, a hard disk, an optical disk, a magneto-optical disk, a compact disc (CD)-ROM, a magnetic tape, a nonvolatile memory card, or a ROM. In addition, the program recorded in the storage medium is not limited to a program that is processed alone, and a program that is processed while being operated on an operating system (OS) in cooperation with functions of another software and an extension board also falls within the scope of each of the example embodiments.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The above-described example embodiments and modifications thereof can be appropriately combined.

Some or all of the above-described example embodiments may be described as in the following supplementary notes, but are not limited to the following supplementary notes.

Supplementary Note

[Supplementary Note 1]
A virtual space providing device including:
an output control means configured to perform control to output an output image, which is an image showing a virtual space according to an avatar, to a user who operates the avatar;
a line-of-sight estimation means configured to estimate a line of sight of the user based on a predetermined range on the output image; and
an emotion estimation means configured to estimate an emotion of the user based on a captured image in which the user is shown.

[Supplementary Note 2]
The virtual space providing device according to supplementary note 1, in which
the predetermined range is defined in the output image at a specific position on the image, and
the line-of-sight estimation means estimates that the line of sight of the user is directed to a gaze object that is an object shown in the predetermined range.

[Supplementary Note 3]
The virtual space providing device according to supplementary note 2, in which
the output image is an image showing the virtual space based on a viewpoint from the avatar, and
the line-of-sight estimation means estimates the line of sight of the user based on the predetermined range according to a line of sight of the avatar.

[Supplementary Note 4]
The virtual space providing device according to supplementary note 2 or 3, in which
the output control means adds emotion information indicating the estimated emotion of the user toward the gaze object.

[Supplementary Note 5]
The virtual space providing device according to any one of supplementary notes 1 to 4, in which
the output control means adds emotion information indicating the estimated emotion of the user to the avatar operated by the user.

[Supplementary Note 6]
The virtual space providing device according to any one of supplementary notes 1 to 5, further including:
a reception means configured to receive an emotion estimation timing, in which
the line-of-sight estimation means estimates a line of sight of the another user who operates another avatar shown in the output image according to the received timing, and
the emotion estimation means estimates an emotion of the another user based on a captured image in which the another user is shown according to the received timing.

[Supplementary Note 7]
The virtual space providing device according to any one of supplementary notes 1 to 6, in which
the output control means performs control to output the output image in which the outside of the predetermined range is blurred to the user.

[Supplementary Note 8]
The virtual space providing device according to any one of supplementary notes 1 to 7, further including:
a determination means configured to determine whether the avatar is permitted to enter a specific region, which is a partial region of the virtual space, based on the estimated emotion of the user.

[Supplementary Note 9]
The virtual space providing device according to any one of supplementary notes 2 to 4, in which
when the gaze object is specified, the output control means superimposes information regarding the gaze object on the output image.

[Supplementary Note 10]
The virtual space providing device according to any one of supplementary notes 2 to 4 and 9, in which
the emotion estimation means stores the estimated emotion of the user and the gaze object in association with each other.

[Supplementary Note 11]
A virtual space providing method including:
performing control to output an output image, which is an image showing a virtual space according to an avatar, to a user who operates the avatar;
estimating a line of sight of the user based on a predetermined range on the output image; and
estimating an emotion of the user based on a captured image in which the user is shown.

[Supplementary Note 12]
The virtual space providing method according to supplementary note 11, in which
the predetermined range is defined in the output image at a specific position on the image, and
in the estimating of the line of sight of the user, it is estimated that the line of sight of the user is directed to a gaze object that is an object shown in the predetermined range.

[Supplementary Note 13]
The virtual space providing method according to supplementary note 12, in which
the output image is an image showing the virtual space based on a viewpoint from the avatar, and
in the estimating of the line of sight of the user, the line of sight of the user is estimated based on the predetermined range according to a line of sight of the avatar.

[Supplementary Note 14]
The virtual space providing method according to supplementary note 12 or 13, in which
emotion information indicating the estimated emotion of the user toward the gaze object is added.

[Supplementary Note 15]
The virtual space providing method according to any one of supplementary notes 11 to 14, in which
emotion information indicating the estimated emotion of the user is added to the avatar operated by the user.

[Supplementary Note 16]
The virtual space providing method according to any one of supplementary notes 11 to 15, further including:
receiving an emotion estimation timing, in which
in the estimating of the line of sight of the user, a line of sight of the another user who operates another avatar shown in the output image is estimated according to the received timing, and
in the estimating of the emotion of the user, an emotion of the another user is estimated based on a captured image in which the another user is shown according to the received timing.

[Supplementary Note 17]
The virtual space providing method according to any one of supplementary notes 11 to 16, in which
in the performing of the control, the control is performed to output the output image in which the outside of the predetermined range is blurred to the user.

[Supplementary Note 18]
The virtual space providing method according to any one of supplementary notes 11 to 17, further including:
determining whether the avatar is permitted to enter a specific region, which is a partial region of the virtual space, based on the estimated emotion of the user.

[Supplementary Note 19]
The virtual space providing method according to any one of supplementary notes 12 to 14, in which
when the gaze object is specified, information regarding the gaze object is superimposed on the output image.

[Supplementary Note 20]
The virtual space providing method according to any one of supplementary notes 12 to 14 and 19, in which
in the estimating of the emotion of the user, the estimated emotion of the user and the gaze object are stored in association with each other.

[Supplementary Note 21]
A computer-readable storage medium storing a program for causing a computer to execute:
performing control to output an output image, which is an image showing a virtual space according to an avatar, to a user who operates the avatar;
estimating a line of sight of the user based on a predetermined range on the output image; and estimating an emotion of the user based on a captured image in which the user is shown.

[Supplementary Note 22]
The computer-readable storage medium according to supplementary note 21, in which
the predetermined range is defined in the output image at a specific position on the image, and
in the estimating of the line of sight of the user, it is estimated that the line of sight of the user is directed to a gaze object that is an object shown in the predetermined range.

[Supplementary Note 23]
The computer-readable storage medium according to supplementary note 22, in which
the output image is an image showing the virtual space based on a viewpoint from the avatar, and
in the estimating of the line of sight of the user, the line of sight of the user is estimated based on the predetermined range according to a line of sight of the avatar.

[Supplementary Note 24]
The computer-readable storage medium according to supplementary note 22 or 23, in which
in the estimating of the emotion of the user, emotion information indicating the estimated emotion of the user toward the gaze object is added.

[Supplementary Note 25]
The computer-readable storage medium according to any one of supplementary notes 21 to 24, in which
in the estimating of the emotion of the user, emotion information indicating the estimated emotion of the user is added to the avatar operated by the user.

[Supplementary Note 26]
The computer-readable storage medium according to any one of supplementary notes 21 to 25, causing the computer to further execute:
receiving an emotion estimation timing, in which
in the estimating of the line of sight of the user, a line of sight of the another user who operates another avatar shown in the output image is estimated according to the received timing, and
in the estimating of the emotion of the user, an emotion of the another user is estimated based on a captured image in which the another user is shown according to the received timing.

[Supplementary Note 27]
The computer-readable storage medium according to any one of supplementary notes 21 to 26, in which
in the performing of the control, the control is performed to output the output image in which the outside of the predetermined range is blurred to the user.

[Supplementary Note 28]
The computer-readable storage medium according to any one of supplementary notes 21 to 27, causing the computer to further execute:
determining whether the avatar is permitted to enter a specific region, which is a partial region of the virtual space, based on the estimated emotion of the user.

[Supplementary Note 29]
The computer-readable storage medium according to any one of supplementary notes 22 to 24, in which
in the performing of the control, when the gaze object is specified, information regarding the gaze object is superimposed on the output image.

[Supplementary Note 30]
The computer-readable storage medium according to any one of supplementary notes 22 to 24 and 29, in which
in the estimating of the emotion of the user, the estimated emotion of the user and the gaze object are stored in association with each other.

REFERENCE SIGNS LIST 100, 101, 102, 103 Virtual space providing device
110, 113 Output control unit
111, 114 Image generation unit
112 Image transmission unit
120 Line-of-sight estimation unit
130 Emotion estimation unit
140 Reception unit
150 Determination unit
200 User terminal

What is claimed is:

1. A virtual space providing device comprising:
at least one memory storing a computer program; and
at least one processor configured to execute the computer program to
perform control to output an output image, which is an image according to an avatar in a virtual space, to a user who operates the avatar;
estimate that a line of sight of the user is directed toward a predetermined range on the output image, the predetermined range being determined by an orientation of the avatar; and
add emotion information indicating an estimated emotion of the user to an object in the predetermined range.

2. The virtual space providing device according to claim 1, wherein
the processor is configured to execute the computer program to
estimate that the line of sight of the user is directed to a gaze object that is an object shown in the predetermined range.

3. The virtual space providing device according to claim 2, wherein
the output image is an image showing the virtual space based on a viewpoint from the avatar, and
the processor is configured to execute the computer program to
estimate the line of sight of the user based on the predetermined range according to a line of sight of the avatar.

4. The virtual space providing device according to claim 1, wherein the processor is configured to execute the computer program to:
receive an emotion estimation timing,
estimate a line of sight of the another user who operates another avatar shown in the output image according to the received timing, and
estimate an emotion of the another user based on a captured image in which the another user is shown according to the received timing.

5. The virtual space providing device according to claim 1, wherein the processor is configured to execute the computer program to
perform control to output the output image in which the outside of the predetermined range is blurred to the user.

6. The virtual space providing device according to claim 1, wherein the processor is configured to execute the computer program to
determine whether the avatar is permitted to enter a specific region, which is a partial region of the virtual space, based on the estimated emotion of the user.

7. The virtual space providing device according to claim 2, wherein the processor is configured to execute the computer program to,
when the gaze object is specified, superimpose information regarding the gaze object on the output image.

8. The virtual space providing device according to claim 2, wherein the processor is configured to execute the computer program to
store the estimated emotion of the user and the gaze object in association with each other.

9. The virtual space providing device according to claim 1,
  wherein the orientation of the avatar comprises a direction in which the avatar is facing in the virtual space, and
  wherein the at least one processor is further configured to execute the computer program to determine the line of sight of the user based on determining the orientation of the avatar in the virtual space and setting the line of sight of the user based on the orientation of the avatar.

10. The virtual space providing device according to claim 1, wherein the processor is further configured to execute the computer program to:
  determine portions of the output image that are outside of the predetermined range in the output image determined by the orientation of the avatar in the virtual space; and
  based on determining that the portions of the output image are outside of the predetermined range in the output image as determined by the orientation of the avatar in the virtual space, adjust the output image to any of change a color, lighting, and blurring of the portions of the output image.

11. The virtual space providing device according to claim 1, wherein the processor is further configured to execute the computer program to determine whether the emotion information of the user meets at least one predetermined condition of at least one area of the virtual space.

12. A virtual space providing method comprising:
  performing control to output an output image, which is an image according to an avatar in a virtual space, to a user who operates the avatar;
  estimating that a line of sight of the user is directed toward a predetermined range on the output image, the predetermined range being determined by an orientation of the avatar; and
  adding emotion information indicating an estimated emotion of the user to an object in the predetermined range.

13. The virtual space providing method according to claim 12, wherein
  in the estimating of the line of sight of the user, it is estimated that the line of sight of the user is directed to a gaze object that is an object shown in the predetermined range.

14. The virtual space providing method according to claim 13, wherein
  the output image is an image showing the virtual space based on a viewpoint from the avatar, and
  in the estimating of the line of sight of the user, the line of sight of the user is estimated based on the predetermined range according to a line of sight of the avatar.

15. A non-transitory computer-readable storage medium storing a program for causing a computer to execute:
  performing control to output an output image, which is an image according to an avatar in a virtual space, to a user who operates the avatar;
  estimating that a line of sight of the user is directed toward a predetermined range on the output image, the predetermined range being determined by an orientation of the avatar; and
  adding emotion information indicating an estimated emotion of the user to an object in the predetermined range.

16. The non-transitory computer-readable storage medium according to claim 15, wherein
  in the estimating of the line of sight of the user, it is estimated that the line of sight of the user is directed to a gaze object that is an object shown in the predetermined range.

17. The non-transitory computer-readable storage medium according to claim 16, wherein
  the output image is an image showing the virtual space based on a viewpoint from the avatar, and
  in the estimating of the line of sight of the user, the line of sight of the user is estimated based on the predetermined range according to a line of sight of the avatar.

18. A virtual space providing device comprising:
  at least one memory storing a computer program; and
  at least one processor configured to execute the computer program to
    perform control to output an output image, which is an image according to an avatar in a virtual space, to a user who operates the avatar;
    estimate that a line of sight of the user is directed toward a predetermined range on the output image, the predetermined range being determined by an orientation of the avatar; and
    add emotion information indicating an estimated emotion of the user to the avatar operated by the user.

19. A virtual space providing method comprising:
  performing control to output an output image, which is an image according to an avatar in a virtual space, to a user who operates the avatar;
  estimating that a line of sight of the user is directed toward a predetermined range on the output image, the predetermined range being determined by an orientation of the avatar; and
  adding emotion information indicating an estimated emotion of the user to the avatar operated by the user.

20. A non-transitory computer-readable storage medium storing a program for causing a computer to execute:
  performing control to output an output image, which is an image according to an avatar in a virtual space, to a user who operates the avatar;
  estimating that a line of sight of the user is directed toward a predetermined range on the output image, the predetermined range being determined by an orientation of the avatar; and
  adding emotion information indicating an estimated emotion of the user to the avatar operated by the user.

* * * * *